(12) United States Patent
Daigle

(10) Patent No.: US 7,734,026 B2
(45) Date of Patent: *Jun. 8, 2010

(54) USER SELECTED CALLER ID OVERRIDE

(75) Inventor: Brian K. Daigle, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 340 days.

This patent is subject to a terminal disclaimer.

(21) Appl. No.: 11/639,798

(22) Filed: Dec. 15, 2006

(65) Prior Publication Data

US 2007/0153991 A1 Jul. 5, 2007

Related U.S. Application Data

(63) Continuation-in-part of application No. 11/321,618, filed on Dec. 29, 2005.

(51) Int. Cl.
*H04M 1/56* (2006.01)
(52) U.S. Cl. .................. 379/142.03; 455/550.1
(58) Field of Classification Search ............ 379/142.03; 455/415

See application file for complete search history.

(56) References Cited

U.S. PATENT DOCUMENTS

| | | | |
|---|---|---|---|
| 5,058,152 A | 10/1991 | Solomon et al. | |
| 5,537,657 A | 7/1996 | King, III et al. | |
| 5,864,612 A * | 1/1999 | Strauss et al. ......... | 379/142.03 |
| 5,901,209 A * | 5/1999 | Tannenbaum et al. .. | 379/142.09 |
| 6,529,500 B1 | 3/2003 | Pandharipande | |
| 6,603,977 B1 | 8/2003 | Walsh et al. | |
| 6,661,785 B1 | 12/2003 | Zhang et al. | |
| 6,665,611 B1 | 12/2003 | Oran et al. | |
| 6,674,745 B1 | 1/2004 | Schuster et al. | |
| 6,678,357 B2 | 1/2004 | Stumer et al. | |
| 6,694,004 B1 | 2/2004 | Knoerle et al. | |
| 6,868,074 B1 | 3/2005 | Hanson | |
| 6,912,399 B2 | 6/2005 | Zirul et al. | |
| 2002/0072348 A1 | 6/2002 | Wheeler et al. | |
| 2002/0160745 A1 | 10/2002 | Wang | |
| 2003/0087652 A1 | 5/2003 | Simon et al. | |
| 2004/0101123 A1 | 5/2004 | Garcia | |
| 2004/0140928 A1 | 7/2004 | Cleghorn | |
| 2004/0209605 A1 * | 10/2004 | Urban et al. ................ | 455/415 |
| 2005/0047574 A1 | 3/2005 | Reid | |
| 2005/0063529 A1 | 3/2005 | Meldrum et al. | |

(Continued)

OTHER PUBLICATIONS

U.S. Appl. No. 11/024,135, filed Dec. 2001.

(Continued)

*Primary Examiner*—Curtis Kuntz
*Assistant Examiner*—Maria El-Zoobi
(74) *Attorney, Agent, or Firm*—Scott P. Zimmerman PLLC

(57) ABSTRACT

Universal caller identification services are provided to enable a subscriber to maintain his or her identity by communicating an outgoing communication from any one of a plurality of different communications and communicating a communications signal to a called party communications address with a Universal CallerID to always identify the calling party. Further exemplary embodiments provide the Universal CallerID signal and a third party identifier to a called party and/or the Universal CallerID signal and a called party identifier to a third party. The Universal CallerID signal and a third party identifier and/or the Universal CallerID signal and a called party identifier may include text, video, voice, and/or digital data.

18 Claims, 15 Drawing Sheets

U.S. PATENT DOCUMENTS

2005/0232243 A1  10/2005  Adamczyk
2005/0250468 A1  11/2005  Lu
2008/0247523 A1* 10/2008  Ying et al. ............... 379/93.02

OTHER PUBLICATIONS

U.S. Appl. No. 11/089,296, filed Mar. 2005.
U.S. Appl. No. 11/318,110, filed Dec. 2005.

* cited by examiner

USER SELECTED CALLER ID OVERRIDE

CROSS REFERENCE TO RELATED APPLICATIONS

This application is a continuation-in-part of commonly assigned U.S. patent application Ser. No. 11/321,618 entitled "User Selected Caller ID Override", filed on Dec. 29, 2005, incorporated herein by this reference.

Additionally, this application relates to a commonly assigned, co-pending application entitled "Caller Identification of Recipient that Answered a Simultaneous or Routed Communication" Ser. No. 11/639,818 filed simultaneously herewith, and of which is incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to field of communications. More particularly, this invention relates to a system and method for caller identification messaging.

Telecommunications has experienced explosive growth, and more growth is planned as telecommunication access and numerous communications devices improve. This explosive growth is revolutionizing special services offered to subscribing customers. Of the special service offerings, the most relevant to this invention is the caller identification or Caller ID services. An individual or a user of a telephone that is served by the Caller ID service is provided with directory information of a calling party. Presently available Caller ID systems provide the calling party telephone number and a billing name associated with the calling party telephone number (if available) when an incoming caller line identification (ICLID) signal can be detected, decoded, and transmitted to the called telephone or other display device associated with the called telephone (e.g., a Caller ID device). The Caller ID services also allow a called party to receive directory information for other incoming calls while the called party phone is used (e.g., during a conversation with another party); this service is sometimes referred to as Caller ID Call Waiting service.

The individual may use the displayed Caller ID information to make a decision whether to answer and/or to prepare for the call. Thereafter, the individual has a record of the Caller ID information and may use that information to return a call or to track incoming calls. A problem arises when the individual cannot recognize the Caller ID information. For example, if the calling party uses a pay phone, a friend's phone, or a work phone to place the incoming call, then the Caller ID information displays the number associated with each of these communications addresses. If the individual does not recognize the Caller ID information, the individual, then, cannot associate the number with the calling party. Other problems exist with limited information transmitted with the ICLID signal and with limited capabilities of Caller ID devices. In recent years, telephony providers and manufacturers have tried to provide alternate caller identification systems and methods. However, these alternatives have proved to have several drawbacks that include specialized peripheral hardware and equipment, limited methods for inputting a textual message and/or alphanumeric message, and limiting communications capabilities.

SUMMARY

The aforementioned problems, and other problems, are reduced, according to exemplary embodiments, by methods, systems, and devices that provide a Universal Caller ID service. According to some of the exemplary embodiments, a calling party uses a communications device that includes a computer program product—a Universal Caller ID Module—that supplants the incoming calling line identification (ICLID) signal associated with a communication address of the communications device with a Universal Caller ID signal and communicates the Universal Caller ID signal to a destination communications address of a called party. The Universal Caller ID signal includes a universal communications address or alternate common identifier of the calling party (e.g., a single telephone number that is associated with multiple communications addresses of a subscriber to the Universal Caller ID service, a name such as a company name that is associated with multiple communications addresses of a subscriber, an audio file, a video file, a picture, a doodle, and other identifiers of the calling party (or alternatively identifiers of the calling party communications address). The Universal Caller ID signal is, associated with multiple communications addresses and/or multiple communications devices used by the subscriber. The subscriber may establish an initial database of communications addresses and/or communications devices to associate with the Universal Caller ID signal and, thereafter, the subscriber may dynamically modify the database. The Universal Caller ID signal may further include an identifier of the destination communications address (e.g., name of called party, address of the called party communications device, such as the destination telephone number, etc.), and/or an identifier of the calling party communications device (e.g., POTS phone, cellular phone, personal digital assistant, VOIP phone, etc.). Alternatively, the subscriber may use a conventional telephone to access a communications network having a server-component Universal Caller ID Module, activate Universal Caller ID services, provide communications instructions associated with each communications address associated with the Universal Caller ID services, and communicate the Universal Caller ID signal to the destination communications address. The Universal Caller ID signal may include text, video, voice, and/or digital data. After the Universal Caller ID signal is transmitted to the destination communications address, a called party may act on the universal, shared caller identification signal. For example, the called party may review the Universal Caller ID signal, forward the Universal Caller ID signal, store the Universal Caller ID signal, ignore the Universal Caller ID signal, and/or other handling options. Additionally, a telecommunications customer may subscribe to a blocking service to decline Universal Caller ID signals (similar to Privacy Director). In further exemplary embodiments, the Universal Caller ID signal is updated to include a third party communications identifier (e.g., phone number, name of third party, etc.) that is communicated to the destinations communications address of the called party. For example, the third party may be an incoming call waiting communication to the communications address of the calling party, or, alternatively, the third party may be a communications address that is dialed by the calling party to add to a three way conference with the called party.

The exemplary embodiments also include a computer program product for Universal Caller ID services. The computer program product comprises a computer-readable medium and a Universal Caller ID module stored on the computer-readable medium. The Universal Caller ID module includes computer code that supplants the incoming calling line identification (ICLID) signal associated with the communication address of the communications device with a Universal Caller ID signal and initiates communication of the Universal Caller ID signal and the supplanted Universal Caller ID signal with the third party identifier to the destination communications address as described in further detail below.

Other systems, methods, and/or computer program products according to the exemplary embodiments will be or become apparent to one with skill in the art upon review of the following drawings and detailed description. It is intended that all such additional systems, methods, and/or computer program products be included within and protected by this description and be within the scope of this invention.

DESCRIPTION OF THE DRAWINGS

These and other features, aspects, and advantages of the exemplary embodiments are better understood when the following description is read with reference to the accompanying drawings, wherein.

DESCRIPTION

Figure 1:
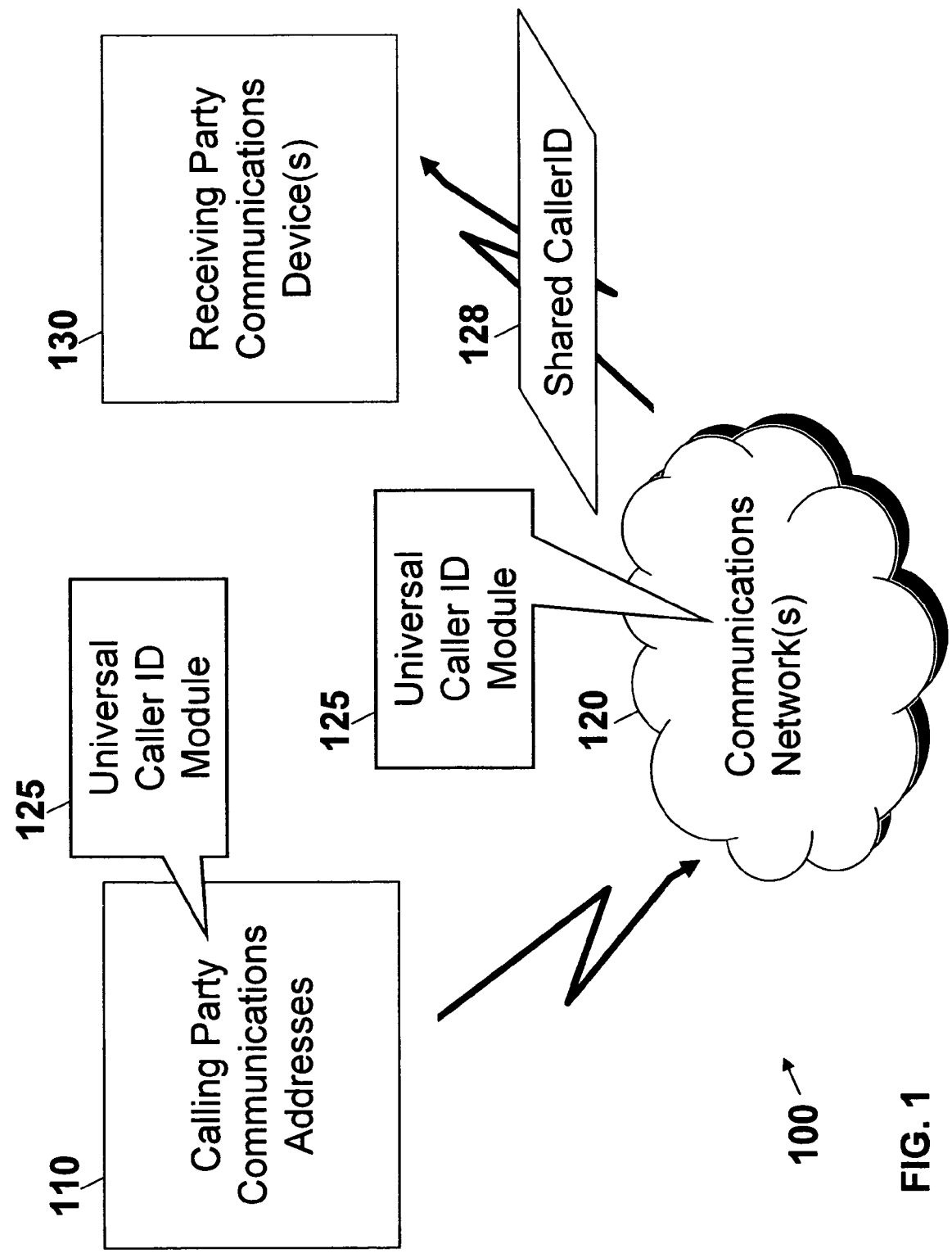
FIG. 1 is a simplified schematic of a Universal Caller ID communications system illustrating a communications network connecting one of a plurality of associated calling party communications addresses with at least one called party communications address and communicating a Universal CallerID for each of the plurality of associated calling party communications addresses according to some of the exemplary embodiments.

The exemplary embodiments now will be described more fully hereinafter with reference to the accompanying drawings. The reader should recognize, however, that the exemplary embodiments may be embodied in many different forms and should not be construed as limited to the embodiments set forth herein. These embodiments are provided so that this disclosure will be thorough and complete and will fully convey the scope of the exemplary embodiments. Moreover, all statements herein reciting exemplary embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods of the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

The exemplary embodiments describe methods, systems, and devices that provide universal caller identification information services, also referred to herein as "Universal Caller ID services." The Universal Caller ID services operate with different communications devices and communications networks to generate, enable, and/or transmit a Universal Caller ID signal that supplants an incoming calling line identification (ICLID) signal associated with a communication address of a subscriber's (also referred to herein as the "calling party") associated communications device with a Universal Caller ID signal and communicates the Universal Caller ID signal to a destination communications address (also referred to herein as the "called party" or the "receiving party"). The Universal Caller ID signal includes a universal communications address or alternate universal identifier of the calling party (e.g., a single telephone number that is associated with multiple communications addresses of the subscriber to the Universal Caller ID service, a name such as a company name or individual's name that is associated with multiple communications addresses of the subscriber, etc.). The Universal Caller ID signal is associated with multiple communications addresses and/or multiple communications devices used by the subscriber. A Universal Caller ID Module automates configuration and communication of the Universal Caller ID Signal (also referred to as a "shared Caller ID"). The Universal Caller ID Signal may be generated by a calling party communications device having the Universal Caller ID Module and/or by a communications network having the Universal Caller ID Modules (e.g., PSTN). Some advantages of Universal Caller ID service include the convenience of having a common caller identification that is shared or that is capable of being shared with a plurality of communications devices used by the subscriber such that the same caller identification is provided to the destinations address regardless of the communications device (or the location of the communications device) used to initiate the communication. Other advantages of the Universal Caller. ID service include the ability to use a conventional POTS phone with a connected communications network to generate the Universal Caller ID signal, the ability of the communications network to transmit the Universal Caller ID signal to a conventional Caller ID device (so that specialized hardware and equipment is not necessitated), the ability to transmit the Universal Caller ID to numerous communications devices associated with a called party, and the ability to identify whether the called party blocks or does not accept communications of Universal Caller ID Signals and, if so, notifying the calling party of the Universal Caller ID delivery failure.

As used herein, the term "communications device" includes wired and wireless communications devices, such as a mobile phone, a wireless phone, a WAP phone, a satellite phone, a computer, a modem, a pager, a digital music device, a digital recording device, a personal digital assistant, an interactive television, a digital signal processor, and a Global Positioning System device. The communications device may include any computer, peripheral device, camera, modem, storage device, telephone, personal digital assistant, and/or mobile phone. The communications network may include coaxial cables, copper wires, fiber optic lines, and/or hybrid-coaxial lines. The communications network may be a cable network operating in the radio-frequency domain and/or the Internet Protocol (IP) domain. The communications network, however, may also include a distributed computing network, such as the Internet (sometimes alternatively known as the "World Wide Web"), an intranet, a local-area network (LAN), and/or a wide-area network (WAN). The communications network may even include wireless portions utilizing any portion of the electromagnetic spectrum and any signaling standard (such as the I.E.E.E. 802 family of standards).

Further, as used herein, the term "data" includes electronic information, such as, for example facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, such as a grouping of destination communications addresses associated with the called party, and/or (4) profiles associated with the Universal Caller ID Signal, including configuration, authenticity, security, and others. Still further, the term "processing," as used herein, encompasses every event from the time the calling party communications device goes off-hook to the termination of the communications signal (e.g., hanging up the telephone call). "Processing" of the communications signal includes routing a voice path and signaling setup and intelligence (e.g., Local Number Portability queries, queries to retrieve Calling Name/Number information, intelligence queries by the AIN components, and standard signaling messages to determine communications routing paths). The term "processing" also includes monitoring an established communications link for possible entry of a universal, shared caller identification signal, switch hook flash, other events that indicate a party on the telephone call has requested an action and delivery of at least one of the caller message and the universal, shared caller identification signal. Finally, in various embodiments, the data (e.g., Universal Caller ID Signal and communications instructions) may be stored by the communications network, a peripheral storage device connected to the communications network, one or more of the communications devices of the called party, and/or other connected networks.

Referring now to the figures, FIG. 1 illustrates a simplified schematic of a Universal Caller ID communications system 100 including a plurality of calling party communications devices 110 having a Universal Caller ID Module 125, at least one communications network 120 having a server-component of the Universal Caller ID Module 125', and at least one called party communications device 130. A calling party uses one of his/her communications devices 110 to initiate a communication to the called party. The Universal Caller ID Module 125 communicates the communications signal with a shared CallerID 128 (also referred to as a Universal Caller ID) to the communications network 120. Alternatively, the calling party communications device 110 may communicate the communications signal and the ICLID signal to the communications network 120. The Universal Caller ID Module 125' residing on the server component of the communications network 120 detects and decodes the ICLID signal, compares the ICLID signal with Universal Caller ID data stored in one or more databases of the communications network 120 to determine if the communications address of the calling party communications device 110 (or the communications device itself) is associated with a shared CallerID, whether the destination communications address(es) accepts a supplanted, shared CallerID signal, and/or presentation capabilities of the called party communications device 130 associated with each destination communications address.

The communications network 120 communicates the shared CallerID signal 128 with the communications signal to the called party communications device 130. According to an exemplary embodiment, the shared CallerID signal 128 is a universal communications address or alternate universal identifier of the calling party (e.g., a single telephone number that is associated with multiple communications addresses of a subscriber to the Universal Caller ID service, a name such as a company name that is associated with multiple communications addresses of a subscriber, a picture, an audio file, a doodle, or another identifier of the calling party or calling party communications address). The shared CallerID signal 128 may be associated with multiple communications addresses and/or multiple communications devices used by the subscriber. The subscriber may establish an initial database of communications addresses and/or communications devices to associate with the Universal Caller ID signal, and, thereafter, the subscriber may dynamically modify the database. The Universal Caller ID signal may further include an identifier of the destination communications address (e.g., name of called party, address of the called party communications device, such as the destination telephone number, etc.), and/or an identifier of the calling party communications device (e.g., POTS phone, cellular phone, personal digital assistant, VOIP phone, etc.).

Figure 2:
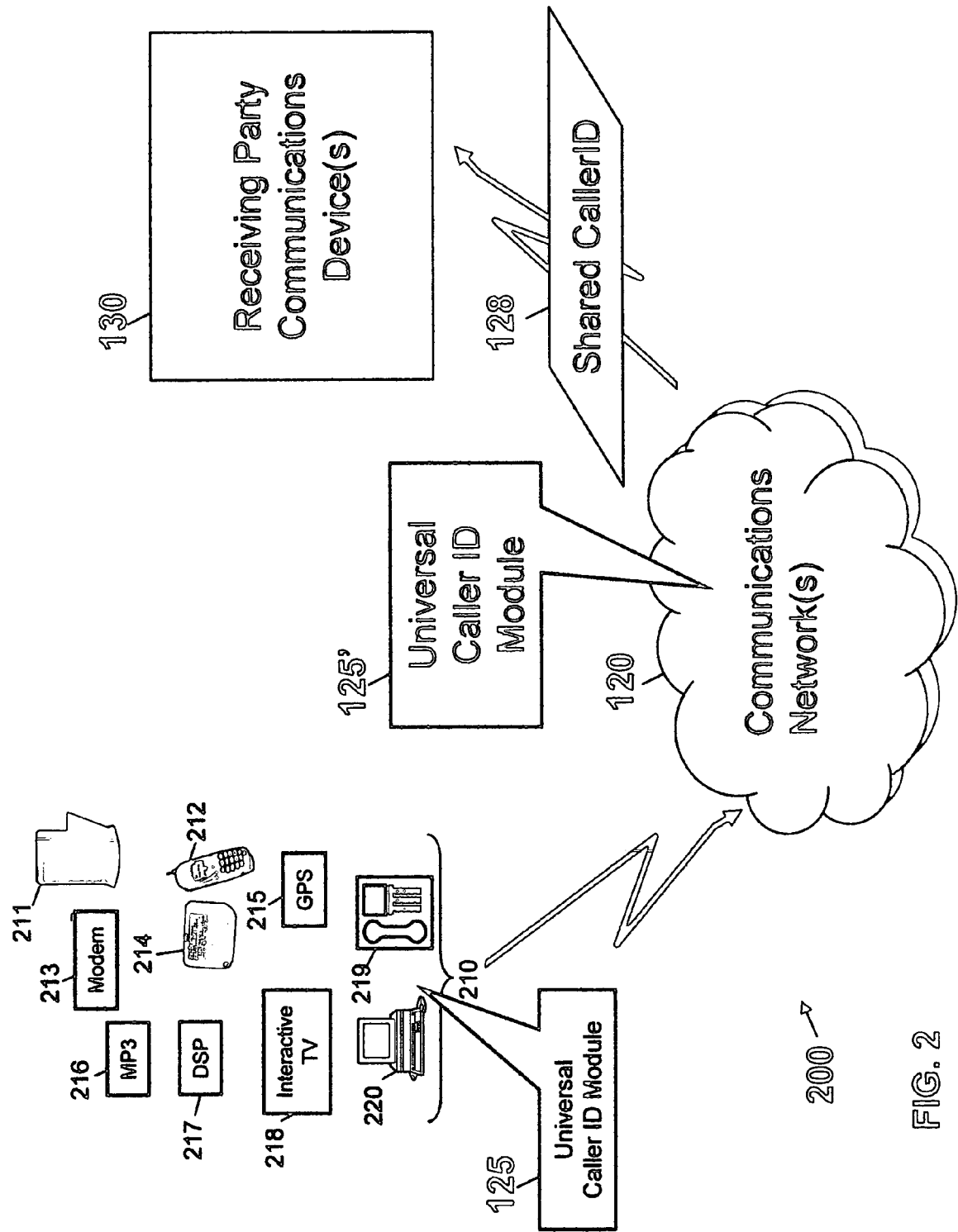
FIG. 2 illustrates the Universal Caller ID communications system of FIG. 1 with more detailed calling party communications devices.

FIG. 2 illustrates a Universal Caller ID communications system 200 similar to the Universal Caller ID communications system 100 of FIG. 1; however, the Universal CallerID communications system 200 illustrates various types of communications devices 210 that may be used by the calling party. The Universal CallerID module 125 and/or the server-component Universal CallerID module 125' operates within any of these various types of communications devices 210 that include a personal digital assistant (PDA) 211, a Voice over Internet Protocol (VOIP) phone 212, a modem 213, an interactive pager 214, a Global Positioning System (GPS) device 215, a digital musical recorder device 216, any computer system utilizing a digital signal processor 217, an interactive television 218, a Plain Old Telephone System (POTS) phone 219, and/or a computer 220. The communications device 210 may also include watches, radios, vehicle electronics, clocks, printers, gateways, and other apparatuses and systems. As those of ordinary skill in the art understand, the communications device 210 (or, alternatively, the communications device 210 and/or the Universal CallerID Module 125' of the communications network 120) has the intelligence for appropriate formatting of the shared CallerID 128. For example, if the communications device 210 uses the Wireless Application Protocol (WAP) technique, then the shared CallerID 128 is formatted using the Wireless Mark-up Language (WML) and configured according to standards known in the art. The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tone Multi-Frequency (DTMF), and other signaling means.

Figure 3:
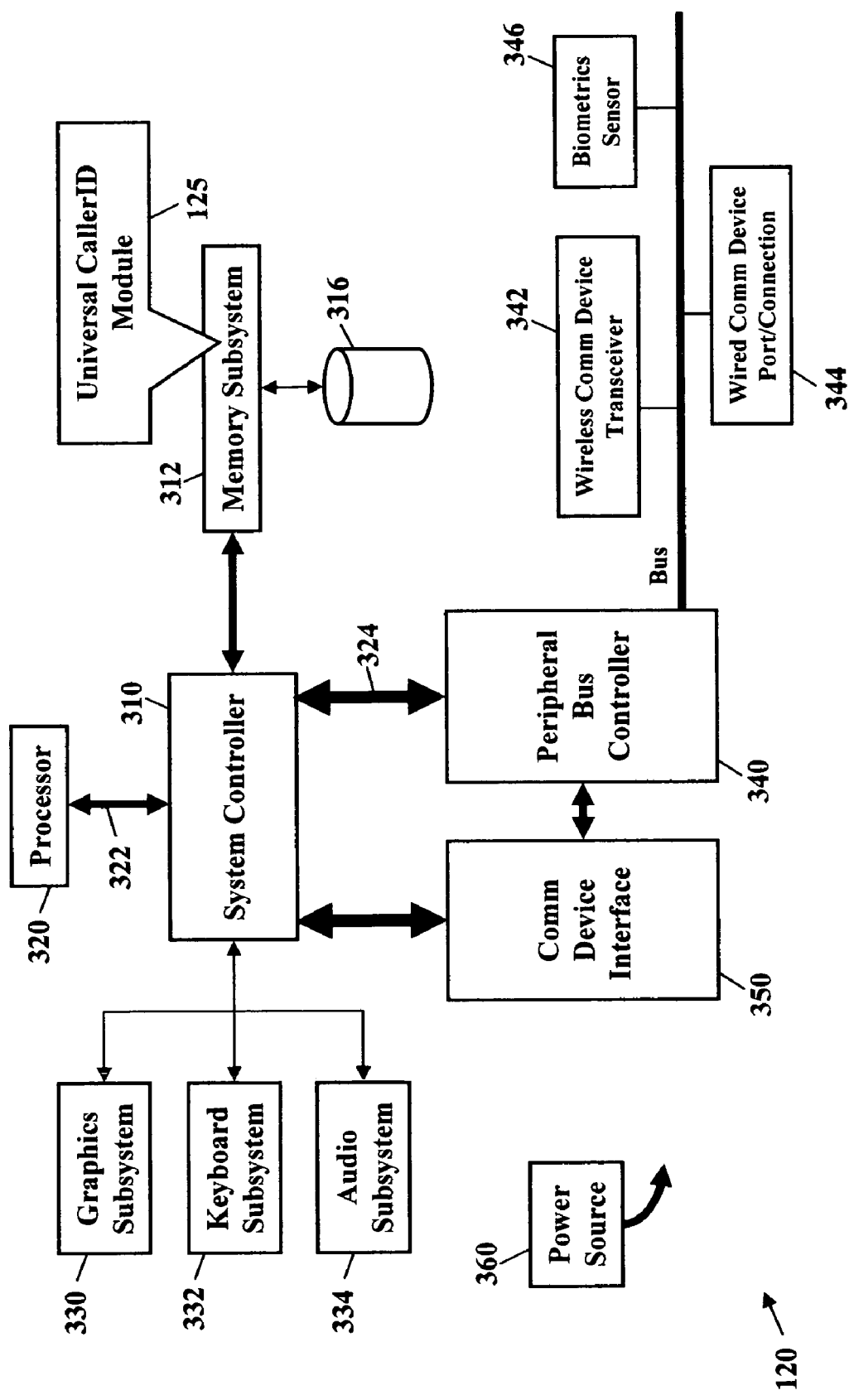
FIG. 3 is a block diagram of a communications device having a Universal Caller ID Module according to some of the exemplary embodiments.

FIG. 3 is a block diagram of exemplary details of the communications device 110 shown in FIG. 1 The communications device 110 includes the Universal CallerID Module 125 that operates within a system memory device 312. The Universal CallerID Module 125, however, could also reside in flash memory or a peripheral storage device 316. The communications device 110 also has one or more central processors 320 executing an operating system. The operating system, as is well known, has a set of instructions that control the internal functions of the communications device 110. A system bus 322 communicates signals, such as data signals, control signals, and address signals, between the central processor(s) 320 and a system controller 310. The system controller 310 provides a bridging function between the memory subsystem 312, the one or more central processors 320, a graphics subsystem 330, a keyboard subsystem 332, an audio subsystem 334, a PCI (Peripheral Controller Interface) bus 324, and a Communications ("Comm") Device Interface 350.

The PCI bus 324 is controlled by a Peripheral Bus Controller 340. The Peripheral Bus Controller 340 is an integrated circuit that serves as an input/output hub for various peripheral ports and/or transceivers. These peripheral ports allow the communications device 110 to communicate with a variety of communications devices through networking ports (such as SCSI or Ethernet) that include Wireless Communications ("Comm") Device Transceiver 342 (such as Wireless 802.11 and Infrared) and Wired Communications ("Comm") Device Port/Connection 344 (such as modem V90+ and compact flash slots). These peripheral ports could also include other networking ports, such as, a serial port (not shown) and/or a parallel port (not shown). The Comm Device Interface 350 allows the communications device 110 to monitor, detect, receive, and decode incoming communications signals to the communications device(s) connected to the Wireless Comm Device Transceiver 342 and/or the Wired Comm Device Port/Connection 346. Further, the Comm Device Interface 350 transmits the outgoing shared CallerID signal (also referred to as the "Universal CalleID signal") to the Wireless Comm Device Transceiver 342 and/or the Wired Comm Device Port/Connection 346. Still further, the communications device 110 may include a power source 360, such as a rechargeable battery to provide power and allow the communications device 110 to be portable. In alternate embodiments, the communications device 110 could include its own telephone line (or other communications connection) to the communications network 120 (not shown). Another alternative may include the communications device 110 incorporated into a specially designed communications device (not shown).

The system memory device (shown as memory subsystem 312 or peripheral storage device 316) may also contain one or more application programs. For example, an application program may cooperate with the operating system and with a video display unit (via graphics subsystem 330) to provide a GUI for the Universal CallerID Module 125. The GUI typically includes a combination of signals communicating with the graphics subsystem 330 and/or the keyboard subsystem 332. The GUI provides a convenient visual and/or audible interface with the user of the communications device 110. As is apparent to those of ordinary skill in the art, the user (e.g., calling party) interacts with the Universal Caller ID Program over a variety of mediums, such as, for example, a stylus, keyboard, and punch buttons of the keyboard subsystem 332, a display screen of the graphics subsystem 330, and/or a voice-activated menu prompt of the audio subsystem 334. Additionally, the peripheral bus controller 340 provides an interface with a biometrics sensor 346, such as, for example, a fingerprint ID device. The biometrics sensor 346 may distinguish between different users that share or otherwise use the communications device 110. Further, the biometrics sensor 346 may provide security features that prevent unauthorized users from exploiting the communications device 110. The biometrics sensor 346 could also comprise retina recognition device and software, DNA/RNA recognition device and software, facial recognition device and software, speech recognition device and software, and/or scent recognition device and software.

Figure 4:
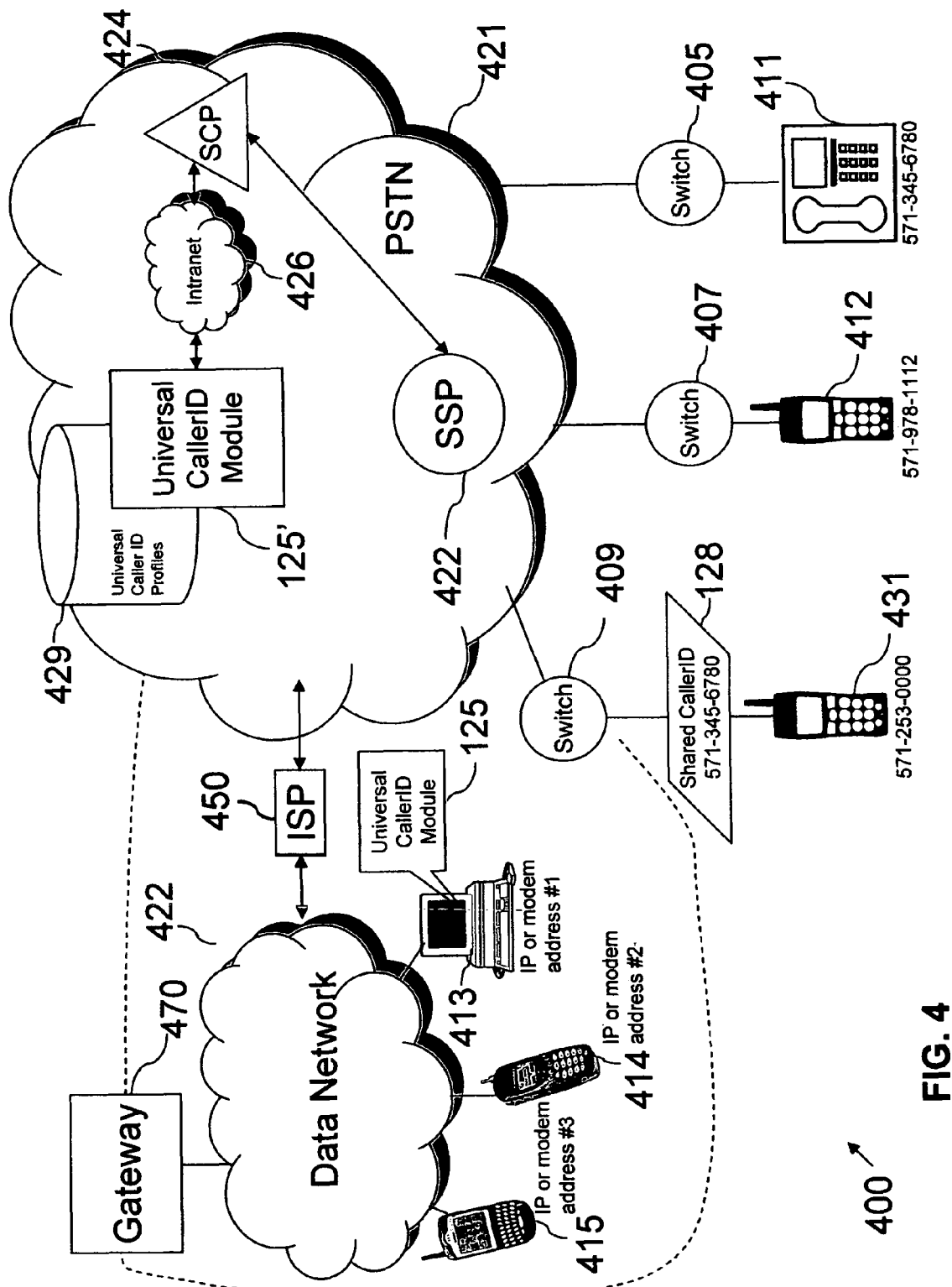
FIG. 4 is a schematic of a Universal Caller ID communications system illustrating communications connections of a plurality of the calling party communications devices and communications addresses, the communications network(s), and the called party communications device according to some of the exemplary embodiments.

FIG. 4 is a schematic of a Universal CallerID communications system 400 illustrating communications connections among the communications network(s) (shown as reference numerals 421 and 422), one of the calling party communications devices, and the called party communications device—shown as cellular phone 431. The Universal CallerID communications system 400 includes a plurality of calling party communications devices that include a POTS telephone 411 having communications address 571-345-6780, a cellular phone 412 having communications address 571-978-1112, a personal computer 413 having a first IP or modem address, a VOIP phone 414 having a second IP or modem address, and a PDA 415 having a third IP or modem address. The POTS phone 411 is coupled with a communications switch 405 connected to a telecommunications network 421. The cellular phone 412 transmits and receives signals with a Mobile Switching Office (MSO) (not shown) that communicates with switch 407 to connect to the telecommunications network 421. The telecommunications network 421 includes a service switching point (SSP) 422, a service control point (SCP) 424, an Intranet 426 (for the telecommunications provider to administer and program the telecommunications network 421 components), a Universal CallerID Dataserver having the Universal CallerID Module 125', and a database of one or more Universal CallerID profiles 429. The system 400 further includes an Internet Service Provider (e.g., America On-Line) 450, a data network 422 communicating with communications devices 413, 414, and 415, a gateway 470, and a third communications switch 409 connected to the called party communications device—shown as a cellular phone 431 (that is capable of communications with the telecommunications network 421 and with the data network 422). Each switch 405, 407, and 409 allows the connected communications device to transceive electronic communication signals via the data network 422 (e.g., world wide electronic data network such as an Internet, an Intranet, and/or an Extranet) and/or the telecommunications network 421 (e.g., a central office (CO), MSO, and/or a combination CO/MSO). The telecommunications network 421 may use any means of coupling one of the switches 405, 407, and 409 to the telecommunications network 421, but the coupling means is preferably high-capacity, high-bandwidth optical transport services, Gigabit Ethernet services, and/or the like. As those of ordinary skill in the art of telecommunications understand, the telecommunications network 421 could also link each of the switches 405, 407, and 409 via other appropriate means, such as, for example a Synchronous Optical Network (SONET) structure with redundant, multiple rings.

According to an exemplary embodiment, a customer and/or user of Universal CallerID services (e.g., someone who subscribes to and/or someone who uses Universal CallerID services) uses one of the plurality of associated calling party communications devices 411, 412, 413, 414, and 415 to gain access to the telecommunications network 421 and/or to the data network 422. For example, the communications signal from communications device 411 is routed through the telecommunications network 421 via switch 405. Similarly, the communications signal from communications device 412 is routed through the telecommunications network via switch 407. The communications signal along with the ICLID signal associated with an address of calling party communications device 411 or 4122 arrive at SSP 422 that analyzes the signals for a matched ICLID (or other identifying signal) that subscribes to Universal CallerID services, and, if so, then routes the incoming communication to the SCP 424 and the Universal CallerID DataServer having the Universal CallerID Module 125' for further processing and routing information. The Universal CallerID DataServer having the Universal CallerID Module 125' accesses the database 429 of Universal CallerID profiles to retrieve a shared CallerID signal 128 to supplant the ICLID signal of the incoming communication and to retrieve other processing information, such as, for example, an instruction from the called party communications device to block Universal CallerID communications, to access presentation capabilities of the called party communications device 431, and/or to obtain other preferences, instructions, files, and/or associated the Universal CallerID profile as further described below. Thereafter, the telecommunications network 421 may communicate the shared CallerID signal 128 via switch 409 to the called party communications device 431. Alternatively, the telecommunications network 421 may transmit the shared CallerID signal 128 via ISP 450 (or other connection) to the data network 422. The data network 422 then sends the shared CallerID signal 128 via the gateway 470 to the called party communications device 431 via switch 409. Still, another alternative, is for the telecommunications network 421 to transmit the shared CallerID signal 128 directly to the gateway 470 (such as when the Universal CallerID profile provides a static IP address of the called party communications device 431) to communicate to the called party communications device 431 via switch 409. In addition to transmitting the shared CallerID signal 128, the telecommunications network 421 may also connect the calling party communications device 411, 412 with the called party communications device 431 to establish a voice connection (e.g., connect the telephone call). That is, when the called party is alerted (via an audible alert and/or visual alert) of the incoming communication(s) (e.g., the shared CallerID signal 128 and/or another alert of the incoming communication), the called party can review the shared CallerID signal 128 and decide whether to answer the call to have a conversation with the calling party.

For example, assume that the subscriber provides or otherwise identifies the communications addresses of devices 411, 412, 413, 414, and 415. These communications devices may be a communications address of a residence, a mobile and/or cellular device either owned or otherwise controlled by the subscriber, an electronic data address (e.g., IP address), a communications address of a business (e.g., a work number), a communications address of a public and/or municipal establishment (e.g., a phone located in an airport terminal), and other communications addresses frequently used by the subscriber. The subscriber may provide communications addresses to the Universal CallerID Module 125' of the server-component of the communications network according to some of exemplary embodiments and obtain a universal, shared communications address that is supplanted for the ICLID signal (e.g., conventional CallerID information) with the incoming communication to the called party communications device. For example, the subscriber may use cellular phone 412 having communications address (571) 978-1112 to place a call to the called party communications device 431. The outgoing communication from the cellular phone 412 is detected and decoded by the telecommunications network 421 and the server-component Universal CallerID Module 125' then associates the universal, shared communications address of 571-345-6780 with the communications address (i.e., 571-978-1112) of the cellular phone 412 in a look up table. Thereafter, the Universal CallerID Module 125' initiates an outgoing communication to the called party communications device 431 that includes the communications signal and the shared CallerID 128 (that has been supplanted as the ICLID signal of cellular phone 412). The look up table may be stored in the database 429 and/or in memory of the calling party communications device 413, 414, and 415. The look up table may be, for example, as shown in Table 1 below.

TABLE 1

An Example of a Universal CallerID Look Up Table

| Universal CallerID | Subscriber Identifier | Associated Communications Addresses to Supplant Universal CallerID |
|---|---|---|
| 571-345-6700 | Subscriber 100100 571-345-6780, John Johnson | 571-345-6780 home phone 571-978-1112 cellular phone 804-231-4567 work phone 192.9.205.21 home computer IP address 192.9.212.35 PDA IP address for work 504-321-9876 VOIP temporary phone number 192.9.212.22 VOIP IP address |
| Susan Johnson | Subscriber 100101 571-345-6780, Susan Johnson (dependent) | 571-345-6780 home phone 571-978-1112 cellular phone 192.9.205.21 home computer IP address |

Table 1 further illustrates that multiple users (John and Susan) can share a similar subscriber identifier communications address (e.g., 571-345-6780 of home phone 411) but have different Universal CallerID signals. For example, if the communications device 413 includes a biometrics sensor or other means to identify the user (e.g., login information, electronic mailing address, and so on), then each user may have a unique universal, caller identification that is provided for his/her outgoing communications.

Alternatively, the universal caller identification (the shared CallerID signal 128 shown in FIG. 4) may be defined as one of the plurality of different associated communications addresses of the Universal Caller ID services unique to each user. For example, FIG. 2 illustrates that multiple users (John and Susan) share the same subscriber identifier used by the communications network—571-345-6780 of home phone 411. However, each user has different associated communications addresses and any one of these respective communications addresses may be used as the shared CallerID for the applicable subscriber. That is, John may use "804-231-4567" as his shared CallerID and Susan may use "571-345-6780" as her shared CallerID.

TABLE 2

Another Example of a Universal CallerID Look Up Table

| Universal CallerID | Subscriber Identifier | Associated Communications Addresses to Supplant Universal CallerID |
|---|---|---|
| 804-231-4567 work phone | Subscriber 100100 571-345-6780, John Johnson | 571-345-6780 home phone 571-978-1112 cellular phone 804-231-4567 work phone 192.9.205.21 home computer IP address 192.9.212.35 PDA IP address for work |

TABLE 2-continued

Another Example of a Universal CallerID Look Up Table

| Universal CallerID | Subscriber Identifier | Associated Communications Addresses to Supplant Universal CallerID |
|---|---|---|
|  |  | 504-321-9876 VOIP temporary phone number 192.9.212.22 VOIP IP address |
| 571-345-6780 home phone | Subscriber 100101 571-345-6780, Susan Johnson (dependent) | 571-345-6780 home phone 571-978-1112 cellular phone 192.9.205.21 home computer IP address |

The personal computer 413, the VOIP phone 414, and the PDA 415 are each respectively coupled or otherwise communicate with the data network 422 via an Internet Protocol (IP) based communications address or modem connection. Each of these devices 413, 414, and 415 include the Universal CallerID Module 125 and memory to store one or more profiles to access upon initiation of an outgoing communication to the called party communications device 431. Consequently, these devices 413, 414, and 415 supplant the ICLID signal with the shared CallerID signal 128 and communicate the shared CallerID signal 128 with the communications signal to the data network 422 for processing and further communication to the called party communications device 431. Further, the subscriber and/or a user may interact with the Universal CallerID Module 125' and with Intranet 426 to access and login to the Universal CallerID DataServer having the Universal CallerID Module 125' to establish, modify, or otherwise manage a Universal CallerID profile in the database 429. Alternatively, an administrator of the telecommunications network 421 could similarly use another personal computer (not shown) and/or alternate workstation (not shown) networked with the Intranet 426 to access, add, delete, store, modify, and manage the database 429 of one or more Universal CallerID profiles. The Universal CallerID profiles control access, sharing, notification, routing, security, transactions, troubleshooting, management, and/or additional processing of Universal CallerID Signals (i.e., the shared CallerID signal 128) exchanged to/from telecommunications network customers, users, and non-customers. More specifically, the Universal CallerID profiles establish preferences for processing the Universal CallerID Signal including (1) archiving the Universal CallerID Signal to a storage device associated with the telecommunications service provider (or alternate storage device), (2) Encrypting the Universal CallerID Signal (or a portion of the Universal CallerID Signal) so that only the called party communications device can decipher the shared CallerID, (3) forwarding the Universal CallerID Signal, (4) associating the Universal CallerID Signal with a variety of fields, files, and/or other data for Universal CallerID Services, such as, for example login information associated with the customer, user, and/or administrator, password, telephone number(s) or Service Node(s) of the customer (this may include a plurality of addresses that are associated with a Service Node or other switch serving the calling party communications devices, TCP/IP addresses serving the calling party communications devices, email address(es) of the subscriber, profile of the called party communications device 431 (e.g., presentation formats of various communications devices), (5) a time or date identifier for activating or deactivating the Universal CallerID service (e.g., day of week or calendar date), (6) other information associated with the incoming line identification (ICLID) communications signal, (7) size and content of Universal CallerID Signal and/or reply(s), (8) delivery failure notification(s), (9) display and/or presentation data associated with another universal identifier (e.g., name, color, font, doodle, etc.), and (10) telecommunications network defaults. Typically, the Universal CallerID profile includes data for (1) the communications address of each registered communications device for the Universal CallerID service, (2) the shared CallerID signal 128 (e.g., the universal identifier to supplant the ICLID signal when connecting the call to the called party communications address including a common communications address, a name, an identifier for a communications device of the communications address, an audio file, a text file, a video file, a picture, and a doodle); (3) an identifier of the originating communications address (e.g., a phone number of the calling party telephone), (4) shared CallerID services associated with at least one of the calling party and the originating address, (5) the identifier of the destinations communications address (e.g., a telephone number of the called party), (6) an identifier of a called party communications device (e.g., a cellular phone), and (7) shared CallerID default service parameters. The data of the Universal CallerID profile provide instructions for (1) billing for communication of shared CallerID signals over the communications network, (2) parameters that enable Universal CallerID including times of day and days of week, (3) parameters that disable Universal CallerID including times of day and days of week, (4) parameters to block Universal CallerID signals, (5) identification and authentication parameters, (6) parameters to bypass the disable parameters, (7) memory services for data stored with shared CallerID signals, and/or (8) configuration and formatting preferences for each calling party communications device communicating with one of the communications networks 421, 422. In addition, the data for the Universal CallerID services may include instructions for troubleshooting problems including error messages. Thus, Universal CallerID DataServer having the Universal CallerID Module 125' functions as a computer server, database, and processor that is dedicated to managing Universal CallerID Services including communications of Universal CallerID Signals over the telecommunications network 421 to other connected networks (e.g., data network 422) and/or connected communications devices (e.g., called party communications device 431).

The telecommunications network 421 may include wired, optical, and/or wireless elements and may further include private network elements, such as private branch exchanges (PBXs), and/or other elements (not shown). The telecommunications network 421 includes Advanced Intelligent Network (AIN) componentry controlling many features of the network. The telecommunications network 421 and/or each of the switches 405, 407, and 409 could also include a packet-based "soft switch" that uses software control to provide voice, video, and/or data services by dynamically changing its connection data rates and protocols types. If the telecommunications network 421 and/or one of the switches 405, 407, and 409 should include a softswitch, the AIN componentry is replaced by an application server that interfaces with the softswitch via a packet protocol, such as Session Initiation Protocol (SIP). The means of communicating the Universal CallerID Signal between or among the calling party communications device 110, the Universal CallerID Device 200, the switches 405, 407, and 409, the telecommunications network 421 including AIN componentry, the data network 422 including the gateway 470, and the called party communications device 130 include a variety of means, including optical transmission of data (e.g., any medium capable of optically transmitting the data), wireless transmission of data (e.g., wireless communications of the data using any portion of the electromagnetic spectrum), and/or fixed-wire transmission of data (e.g., any medium capable of transmitting electrons along a conductor). Fiber optic technologies, spectrum multiplexing (such as Dense Wave Division Multiplexing), Ethernet and Gigabit Ethernet services, Infrared, the family of IEEE 802 standards, and Digital Subscriber Lines (DSL) are just some examples of the transmission means. The signaling between the calling party communications device 411, 412, 413, 414, and/or 415, the switches 405, 407, and 409, the telecommunications network 421 including AIN componentry, the data network 422 including the gateway 470, and the called party communications device 431, however, are well understood in by those of ordinary skill the art and will not be further described. Further, those of ordinary skill in the art will be able to apply the principles of this invention to their own network configurations which may differ substantially from the communications system(s) shown in the figures.

Figure 5:
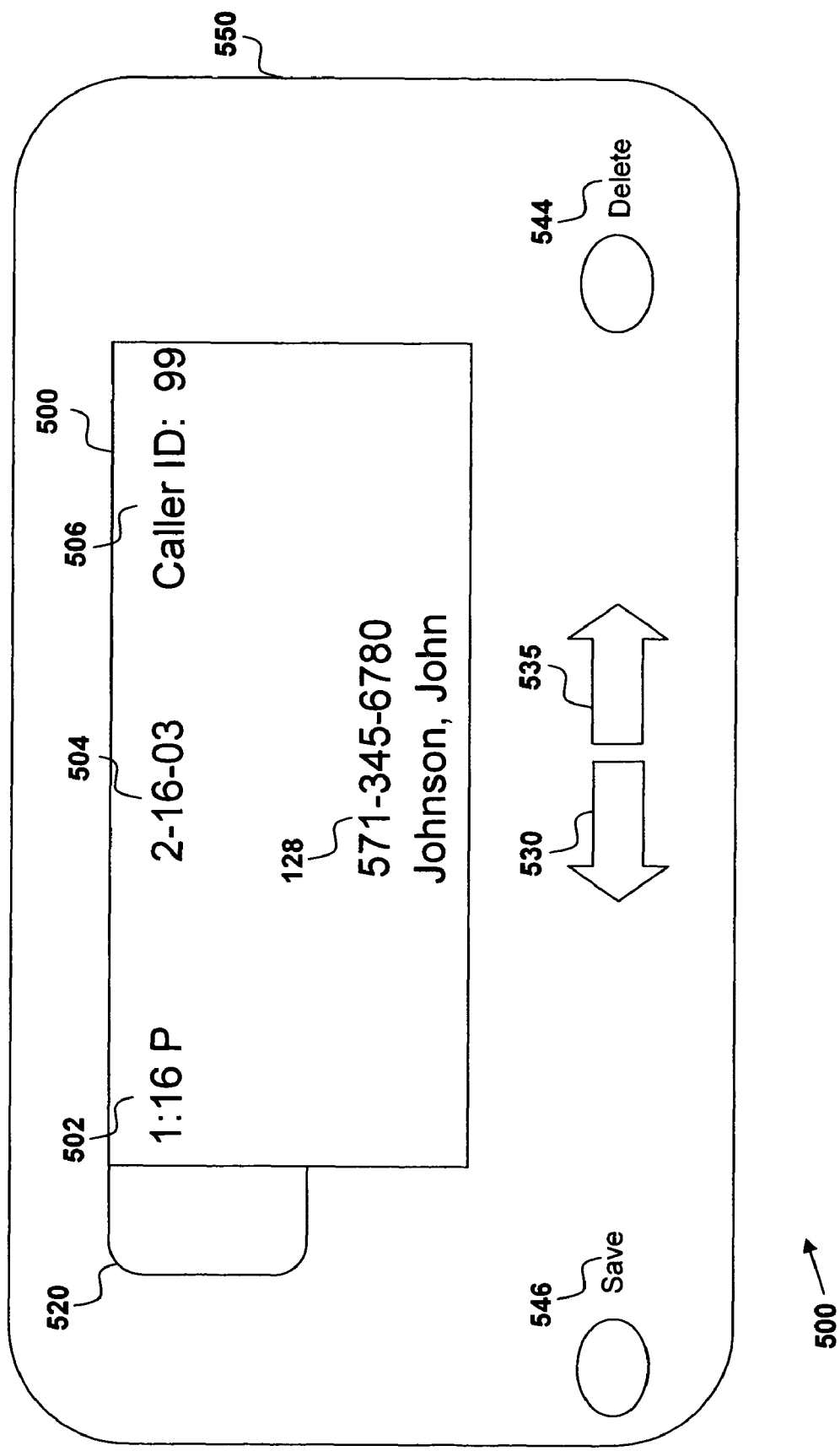
FIG. 5 is a perspective view of a caller identification display of the called party communications device showing the Universal Caller ID according to some of the exemplary embodiments.

FIG. 5 illustrates a schematic of a conventional Caller ID device 500. The Caller ID device 500 includes a display screen 500 having a time identifier 502, a date identifier 504, a numeric identifier 506 of an incoming Caller ID signal or the incoming shared CallerID signal 128 that supplants the ICLID signal, a lighted panel 520 that alerts the called party of a new, incoming, and/or stored Universal CallerID or ICLID signal, a "Save" punch button 546, a "Delete" punch button, a left arrow button 530, a right arrow button 535, and a housing 550 that protects the internal componentry of the Caller ID device 500. Typically, the Caller ID device 500 receives an incoming ICLID signal and displays an originating NANP number 510 (i.e., the telephone number of the calling party) and a name 512 associated with the originating NANP number. Conventional Caller ID devices comply with standards known in the art that limit the display of the ICLID signal to two lines of text, each line containing approximately fifteen (15) characters. As shown in FIG. 5, this invention supplants the ICLID signal (the NANP number and name 512) with a shared CallerID signal 128 of the Universal CallerID Signal so that an incoming call from devices 412, 413, 414, or 415 is identified with the universal caller identification "571-345-6780 Johnson, John" displayed or otherwise presented by conventional the Caller ID device 500.

Figure 6:
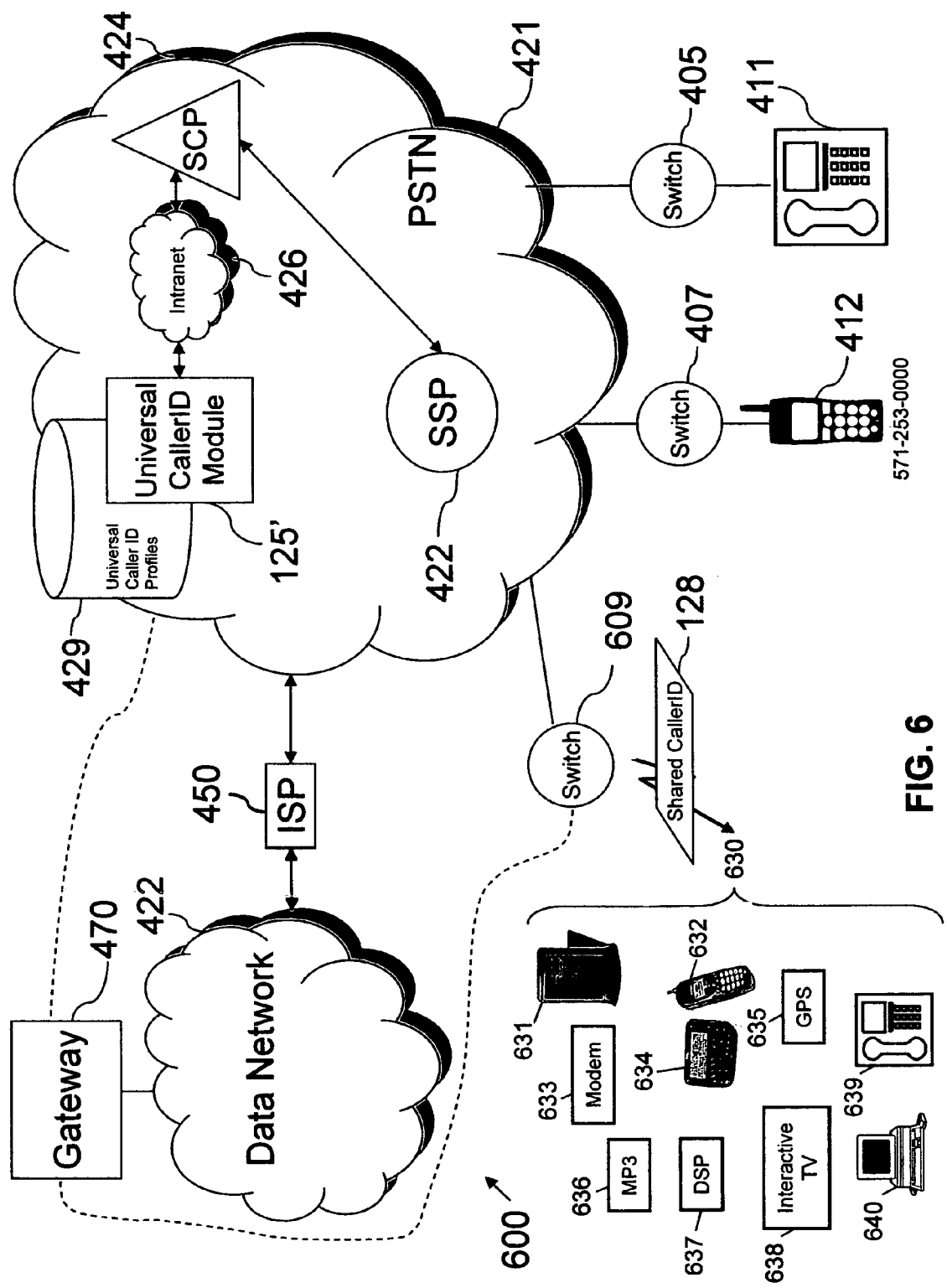
FIG. 6 is another schematic of a Universal Caller ID communications system illustrating communications connections of a plurality of the calling party communications addresses, the communications network(s), and a plurality of communications devices of the called party according to some of the exemplary embodiments.

FIG. 6 is a schematic of a Universal CallerID communications system 600 similar to the Universal CallerID communications system 400 disclosed in FIG. 4. However, the Universal CallerID communications system 600 illustrates alternate called party communications devices 630 that include, e.g., a personal digital assistant (PDA) 631, a Voice over Internet Protocol (VOIP) phone 632, a modem 633, an interactive pager 634, a Global Positioning System (GPS) device 635, a digital musical recorder device 636, any computer system utilizing a digital signal processor 637, an interactive television 638, a Plain Old Telephone System (POTS) phone 639, and/or a computer 640. Regardless of the called party communications device (reference numerals 631-640) that receives the shared CallerID signal 128, this information may need to be formatted accordingly for the called party communications device (including audio, text (e.g., ASCII), video, other digital formats, and combination thereof). Accordingly, the Comm Device Interface 250 of the calling party communications device 413, 414, and 415, the Universal CallerID DataServer having the Universal CallerID Module 125', and/or the gateway 470 of the data network 422 has the intelligence for appropriate formatting of the Universal CallerID Signal 128 for communicating to the called party communications device 630. For example, if the calling party communications device uses the Wireless Application Protocol (WAP) technique, then the shared CallerID signal 128 is formatted using the Wireless Mark-up Language (WML) and must be configured for Caller ID standards known in the art. The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tone Multi-Frequency (DTMF), and other signaling means. Alternatively, the shared CallerID signal 128 may be formatted and/or otherwise configured for presentation by an application and/or componentry of the called party communications device.

Figure 7:
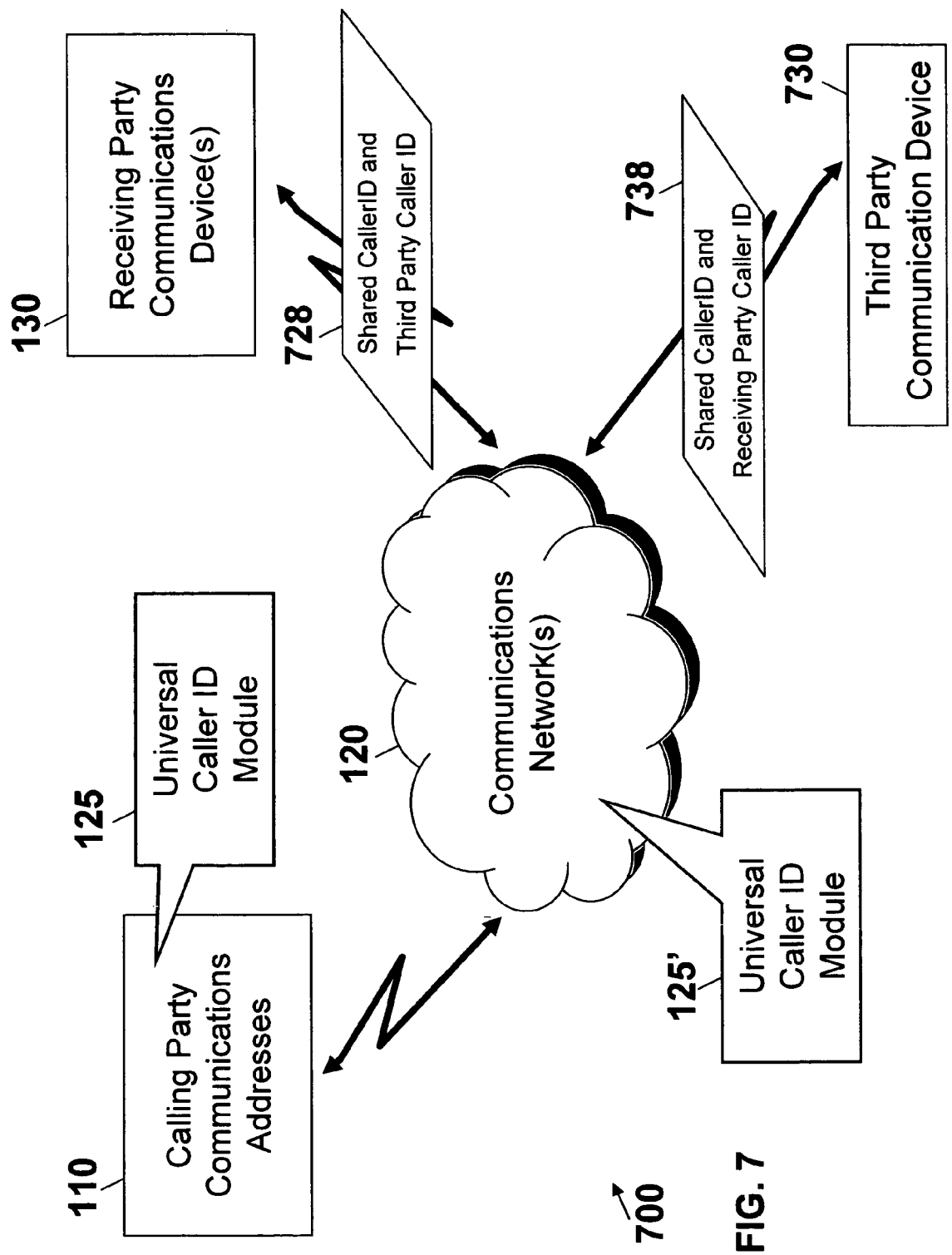
FIG. 7 is another simplified schematic of a Universal Caller ID communications system illustrating a communications network connecting one of a plurality of associated calling party communications addresses with at least one called party communications address and with at least one of a third party communications device according to some of the exemplary embodiments.

Referring now to FIG. 7, a simplified schematic of a Universal Caller ID communications system 700 similar to the Universal Caller ID communications system 100 of FIG. 1 is illustrated; however, the Universal Caller ID communications system 700 further includes at least one third party communications device 730 and communications signals with supplanted ICLID or network information. The third party communications device 730 may initiate a communication to the calling party's communications address 110 during a communications connection of the calling party and the called party (shown as "receiving party communications device" 130 in FIG. 7). For example, the third party communications device 730 may call the calling party's communications address 110 during a communications connection with the called party's communications device 130. The incoming third party communications signal may be alerted to the calling party with a Call Waiting signal. In response to receiving the alert of the incoming third party communication, the calling party may answer, ignore, or elect another call handling option. Alternatively, the calling party may initiate a third party communication to add in the third party communications device 730 to the established communications connection among the calling party and the receiving party (e.g., adding in the third party in a three way conference call initiated by the calling party or alternatively, by the called party).

Regardless of how the third party communications device 730 is communicated to or communicated with in the Universal Caller ID communications system 700, the Universal Caller ID Module 125' residing on the server component of the communications network 120 detects and decodes the ICLID signal/information (or alternative network information of the third party communications address associated with the third party communications device 730) of the third party communications device 730, associates the shared CallerID signal 128, and associates the called party communications address and other network information of the called party communications device 130. Thereafter, the Universal CallerID Module 125' may communicate an updated shared CallerID signal 728 to the called party communications device 130 that includes the universal communications address or alternate universal identifier of the calling party (e.g., a single telephone number that is associated with multiple communications addresses of a subscriber to the Universal Caller ID service, a name such as a company name that is associated with multiple communications addresses of a subscriber, a picture, an audio file, a doodle, or another identifier of the calling party or calling party communications address) and that also includes the communications address and/or other third party identifying network information of the third party communications device 730. Similarly, the Universal CallerID Module 125' may communicate a third party communications signal 738 to the third party communications device 730 that includes the universal communications address or alternate universal identifier of the calling party (e.g., a single telephone number that is associated with multiple communications addresses of a subscriber to the Universal Caller ID service, a name such as a company name that is associated with multiple communications addresses of a subscriber, a picture, an audio file, a doodle, or another identifier of the calling party or calling party communications address) and that also includes the communications address and/or other called party identifying network information of the called party communications device 130. Alternatively, the Universal Caller ID Module 125 of the calling party's communications device may include a unique identifier of the third party destination communications address (e.g., nickname of third party, address of the third party communications device, such as the third party destination telephone number, etc.) and/or an identifier of the third party communications device (e.g., POTS phone, cellular phone, personal digital assistant, VOIP phone, etc.) and may communicate signal 728 to the called party and/or communications signal 738 to the third party.

Figure 8:
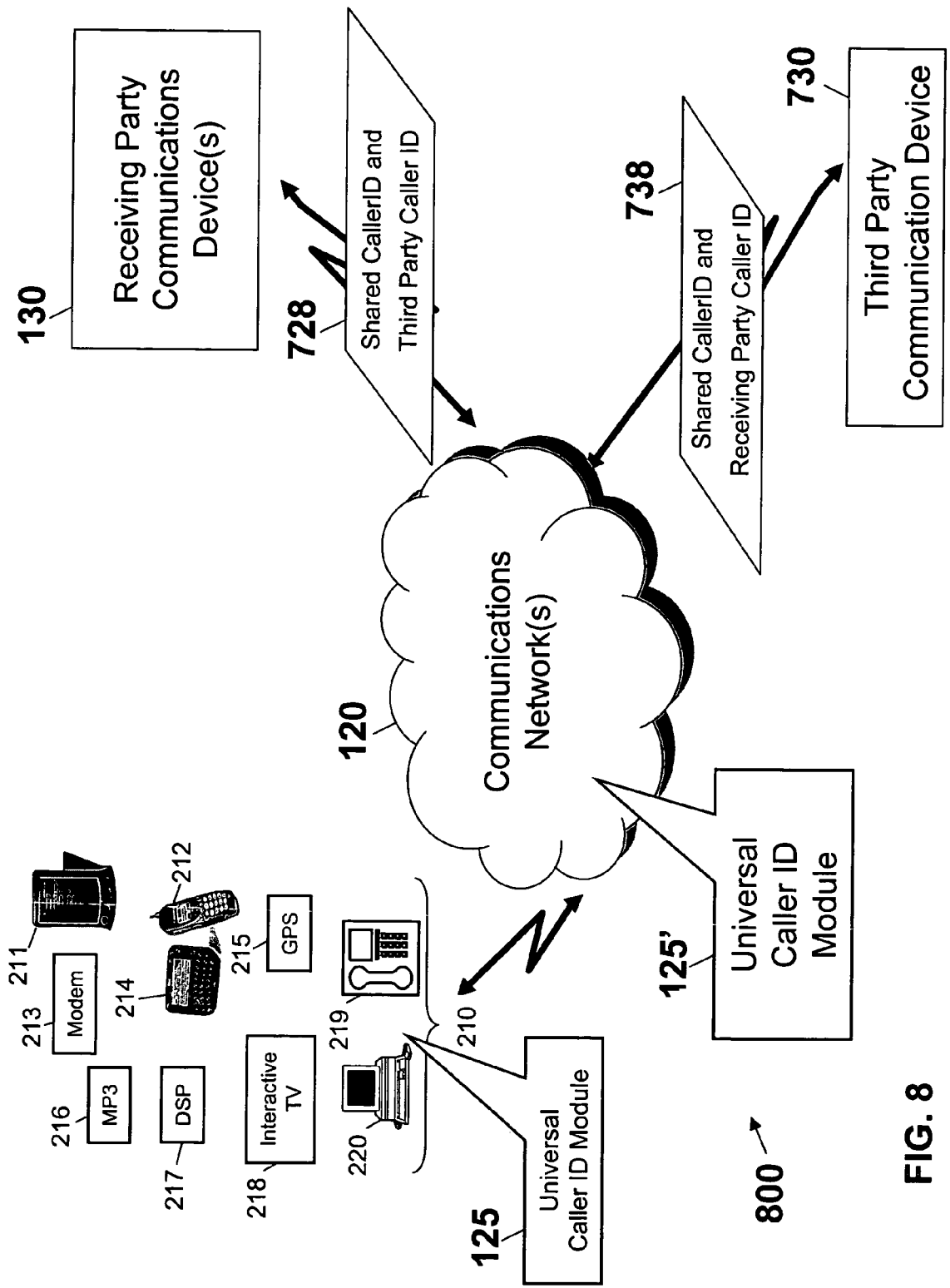
FIG. 8 illustrates the Universal Caller ID communications system of FIG. 7 with more detailed calling party communications devices.

FIG. 8 illustrates a Universal Caller ID communications system 800 similar to the Universal Caller ID communications system 700 of FIG. 7; however, the Universal CallerID communications system 800 illustrates various types of communications devices 210 that may be used by the calling party. The Universal Caller ID module 125 of the calling party's communications device (or, alternatively server-component Universal CallerID module 125') operates within any of these various types of communications devices 210 that include a personal digital assistant (PDA) 211, a Voice over Internet Protocol (VOIP) phone 212, a modem 213, an interactive pager 214, a Global Positioning System (GPS) device 215, a digital musical recorder device 216, any computer system utilizing a digital signal processor 217, an interactive television 218, a Plain Old Telephone System (POTS) phone 219, and/or a computer 220. The communications device 210 may also include watches, radios, vehicle electronics, clocks, printers, gateways, and other apparatuses and systems. As those of ordinary skill in the art understand, the communications device 210 (or, alternatively, the communications device 210 and/or the Universal CallerID Module 125' of the communications network 120) has the intelligence for appropriate formatting of the communications signal 728. For example, if the communications device 210 uses the Wireless Application Protocol (WAP) technique, then the communications signal 728 is formatted using the Wireless Mark-up Language (WML) and configured according to standards known in the art. The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tone Multi-Frequency (DTMF), and other signaling means.

Figure 9:
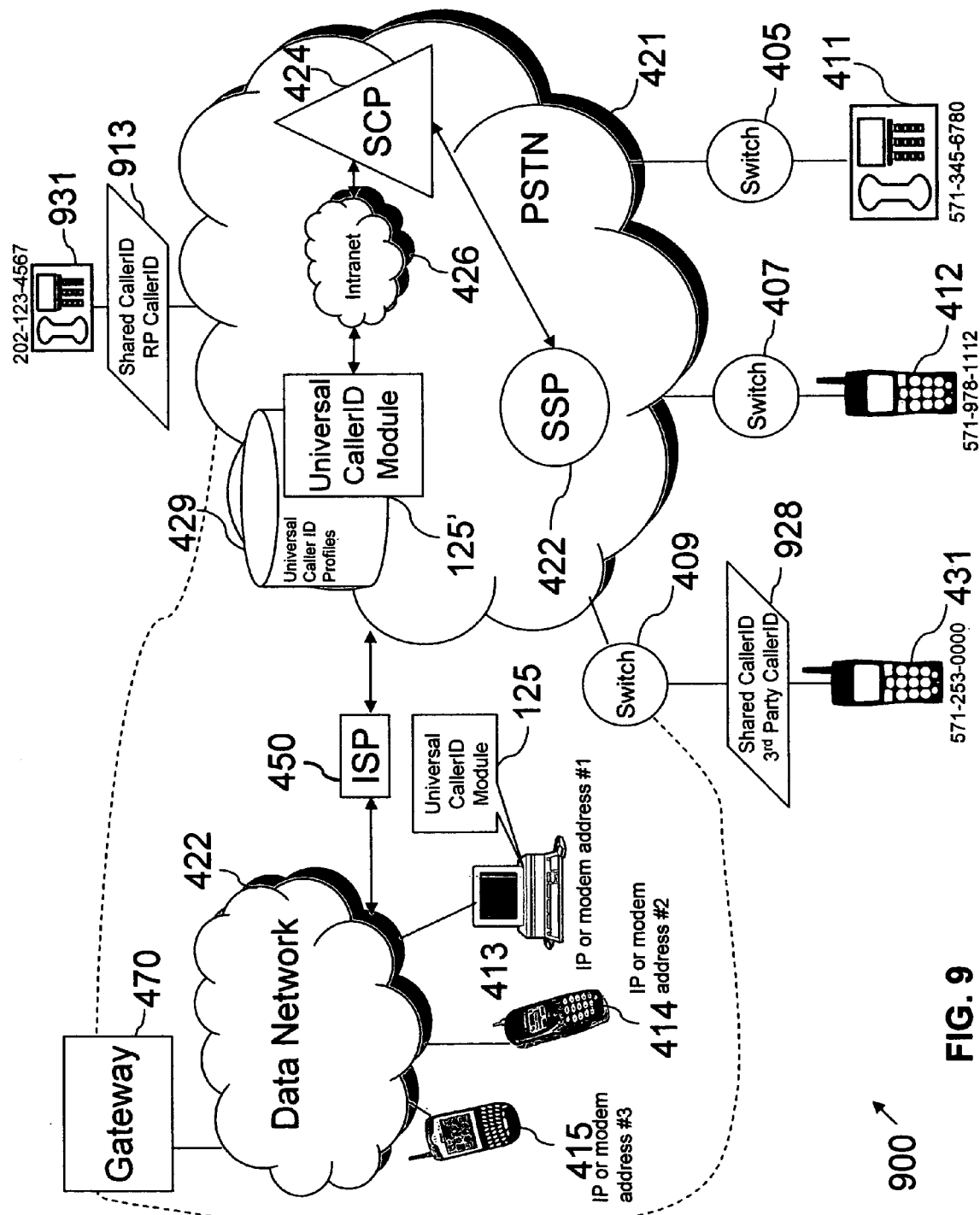
FIG. 9 is a schematic of a Universal Caller ID communications system illustrating communications connections of a plurality of the calling party communications devices and communications addresses, the communications network(s), the called party communications device, and the third party communications device according to some of the exemplary embodiments.

FIG. 9 is a schematic of a Universal CallerID communications system 900 similar to the Universal CallerID communicatins system 400 of FIG. 4; however, Universal CallerID communications system 900 further includes a third part communications device—shown as POTS phone 931 having a communications address of 202-123-4567 and associated with a third party name of "Peter Williams." According to an exemplary embodiment, a third party 931 may initiate a communication to the calling party's communications address 411, 412, 413, 414, and/or 415 during a communications connection of the calling party and the called party 431. For example, the third party communications device 931 may call the calling party's cell phone 412 during a communications connection with the called party's communications device 431. The incoming third party communications signal may be alerted to the calling party with a Call Waiting signal. In response to receiving the alert of the incoming third party communication, the calling party may answer, ignore, or elect another call handling option. Alternatively, the calling party may initiate a third party communication to add in the third party communications device 931 to the established communications connection among the calling party and the receiving party (e.g., adding in the third party in a three way conference call initiated by the calling party or alternatively, by the called party).

Similar to the methods described in the Universal Caller ID communications system 400 of FIG. 4, the Universal CallerID Module 125' may communicate an updated shared CallerID signal 928 to the called party communications device 431 that includes the universal communications address or alternate universal identifier of the calling party (e.g., a single telephone number that is associated with multiple communications addresses of a subscriber to the Universal Caller ID service, a name such as a company name that is associated with multiple communications addresses of a subscriber, a picture, an audio file, a doodle, or another identifier of the calling party or calling party communications address) and that also includes the communications address and/or other third party identifying network information of the third party communications device 931. Similarly, the Universal CallerID Module 125' may communicate a third party communications signal 938 to the third party communications device 931 that includes the universal communications address or alternate universal identifier of the calling party (e.g., a single telephone number that is associated with multiple communications addresses of a subscriber to the Universal Caller ID service, a name such as a company name that is associated with multiple communications addresses of a subscriber, a picture, an audio file, a doodle, or another identifier of the calling party or calling party communications address) and that also includes the communications address and/or other called party identifying network information of the called party communications device 431. Alternatively, the Universal Caller ID Module 125 of the calling party's communications device may include a unique identifier of the third party destination communications address (e.g., nickname of third party, address of the third party communications device, such as the third party destination telephone number, etc.) and/or an identifier of the third party communications device (e.g., POTS phone, cellular phone, personal digital assistant, VOIP phone, etc.) and may communicate signal 928 to the called party and/or communications signal 938 to the third party.

Figure 10:
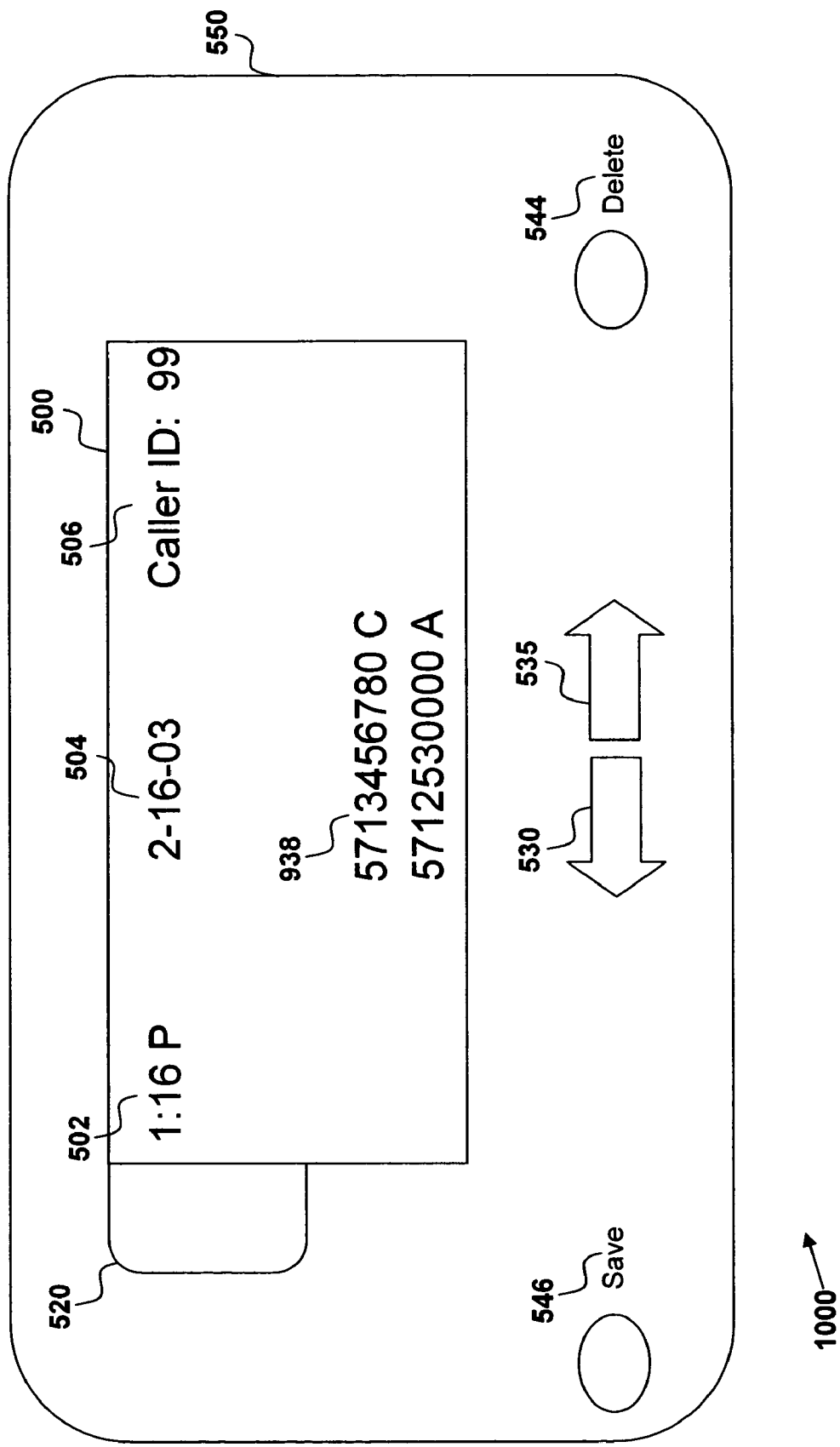
FIG. 10 is a perspective view of a caller identification display of the called party communications device showing the Universal Caller ID and showing the third party communications address according to some of the exemplary embodiments.
Figure 11:
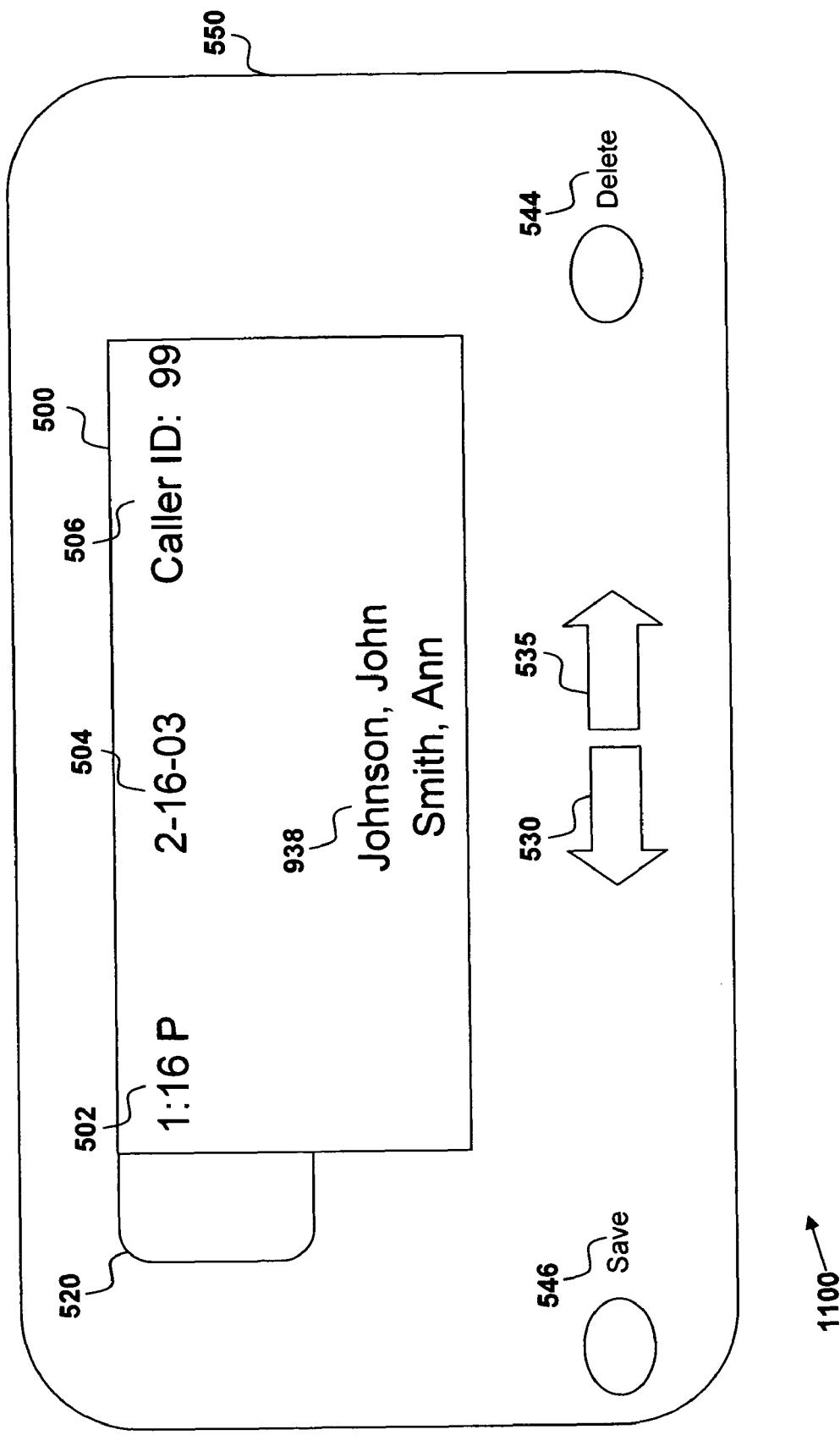
FIG. 11 is an alternate perspective view of a caller identification display of the called party communications device showing the Universal Caller ID and showing the third party identifier according to some of the exemplary embodiments.

FIG. 10 illustrates a schematic of a conventional third party's Caller ID device 1000 similar to the Caller ID device 500 of FIG. 5. The Caller ID device 1000 includes a display screen 500 having a time identifier 502, a date identifier 504, a numeric identifier 506 of the Universal CallerID and Called Party ID signal 938 (shown as Shared CallerID and Receiving Party (RP) CallerID signal 938 of FIG. 9) that is communicated to a third party's communications address, a lighted panel 520 that alerts the third party of the Universal CallerID and Called Party ID signal 938, a "Save" punch button 546, a "Delete" punch button, a left arrow button 530, a right arrow button 535, and a housing 550 that protects the internal componentry of the Caller ID device 1000. The Caller ID device 1000 receives the Universal CallerID and Called Party ID signal 938 and presents the Universal Caller ID "571-345-6780" and the Called Party ID "571-253-000." Alternatively, as shown in FIG. 11, the Universal CallerID and Called Party ID signal 938 may be presented as "Johnson, John" (the Universal CallerID) and as "Smith, Ann" (the Called Party ID).

Figure 12:
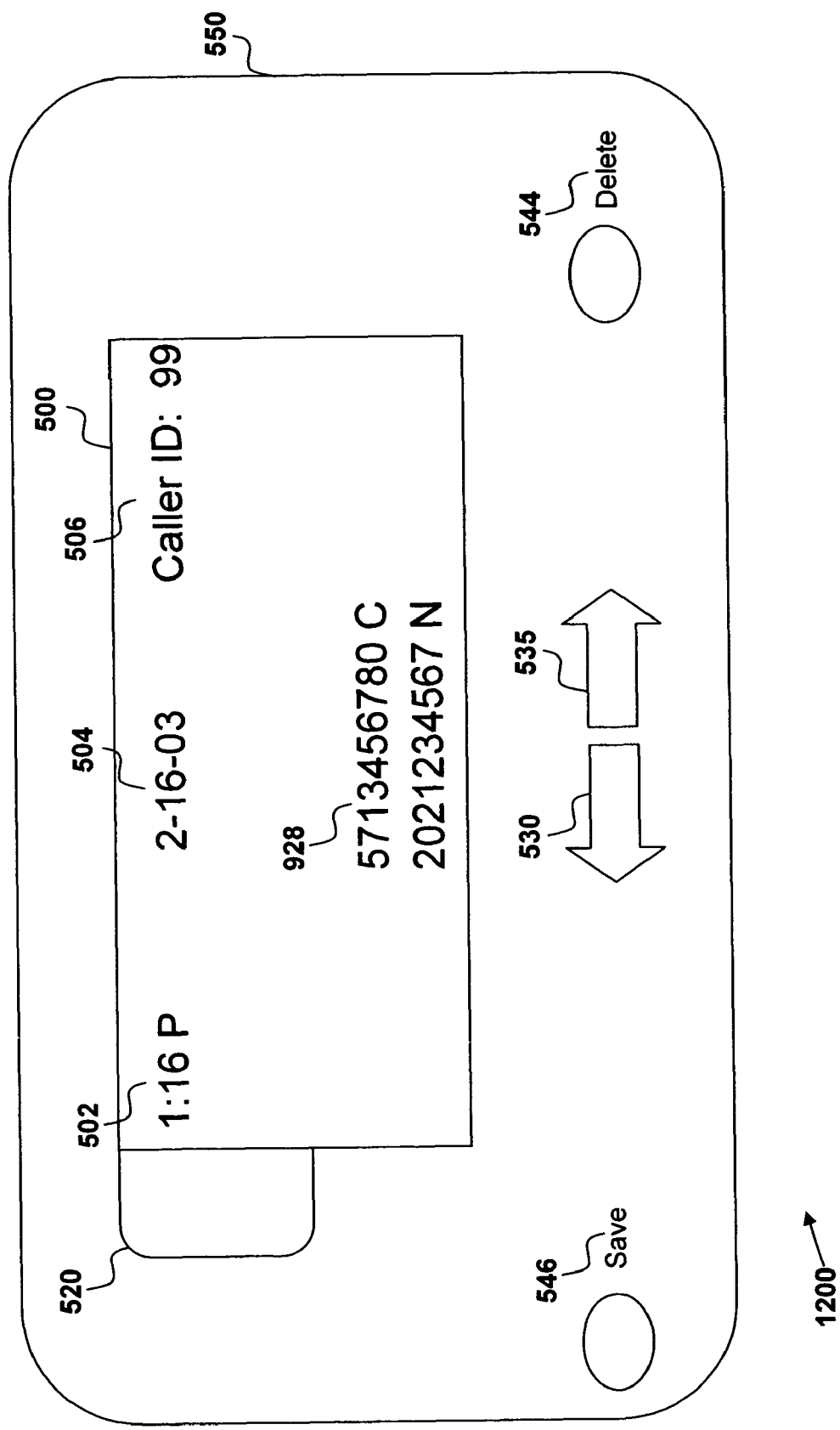
FIG. 12 is a perspective view of a caller identification display of the third party calling waiting communications device showing the Universal Caller ID and showing the called party communications address according to some of the exemplary embodiments.
Figure 13:
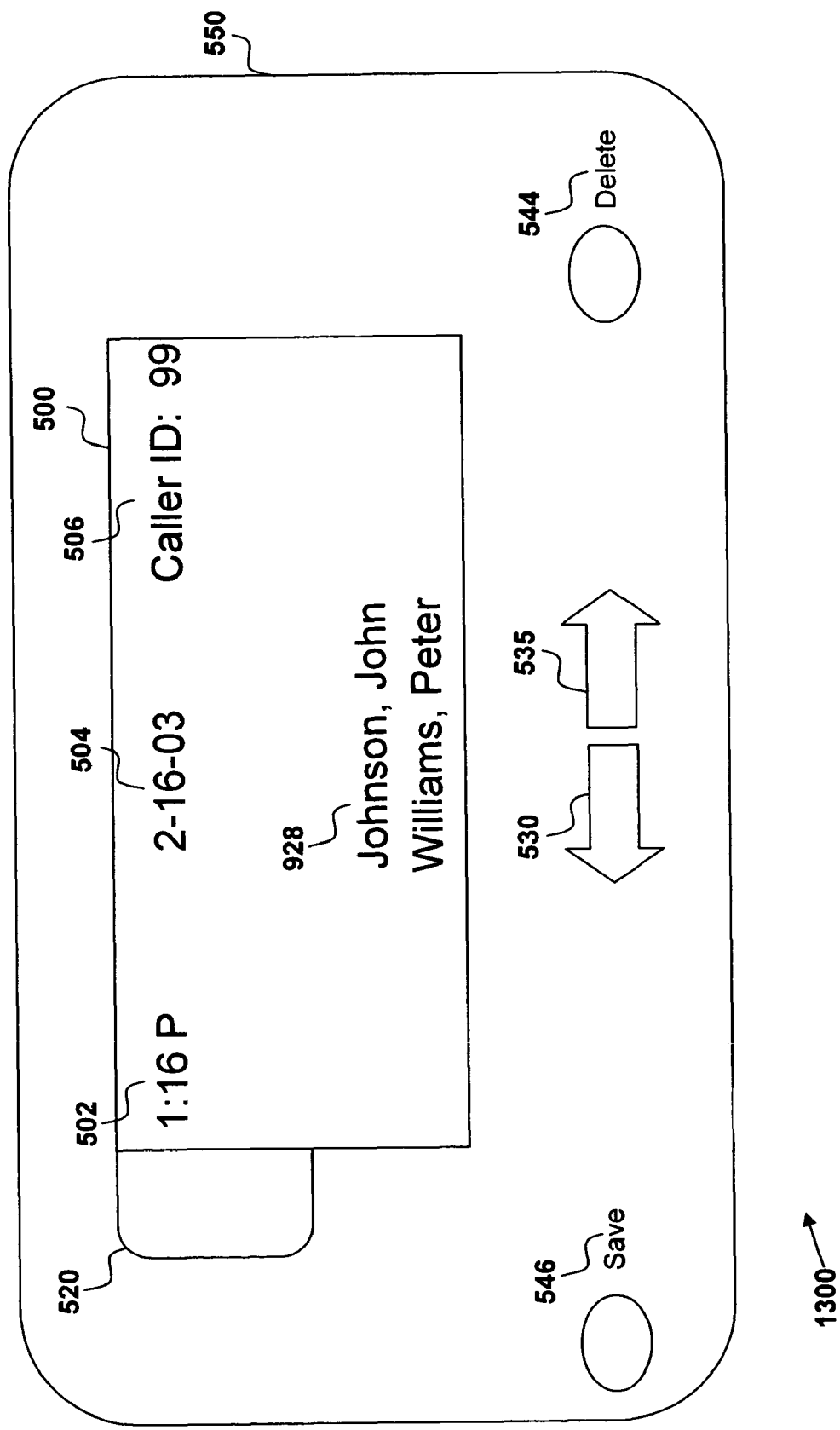
FIG. 13 is a perspective view of a caller identification display of the third party calling waiting communications device showing the Universal Caller ID and showing the called party identifier according to some of the exemplary embodiments.

FIG. 12 illustrates a schematic of the called party's conventional Caller ID device 1200 that is similar to the Caller ID device 500 of FIG. 5. The Caller ID device 1200 receives the Universal CallerID and Third Party Caller ID signal 938 and presents the Universal Caller ID "571-345-6780" and the Third Party Caller ID "202-123-4567." Alternatively, as shown in FIG. 13, the Universal CallerID and Third Party Caller ID signal 928 may be presented as "Johnson, John" (the Universal CallerID) and as "Williams, Peter" (the Third Party Caller ID).

Figure 14:
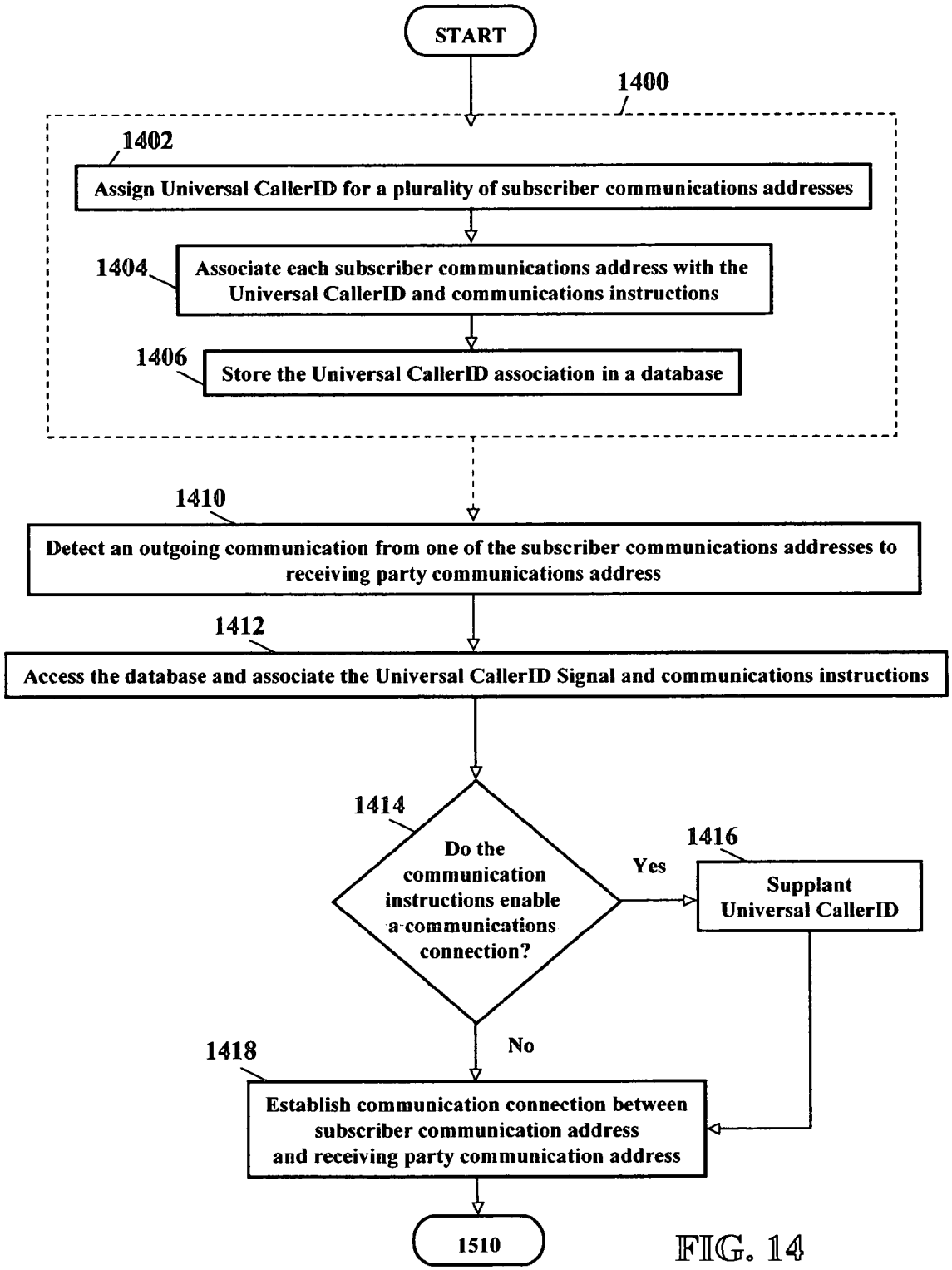
FIGS. 14-15 are flowcharts illustrating communications methods for Universal Caller ID according to some of the exemplary embodiments.
Figure 15:
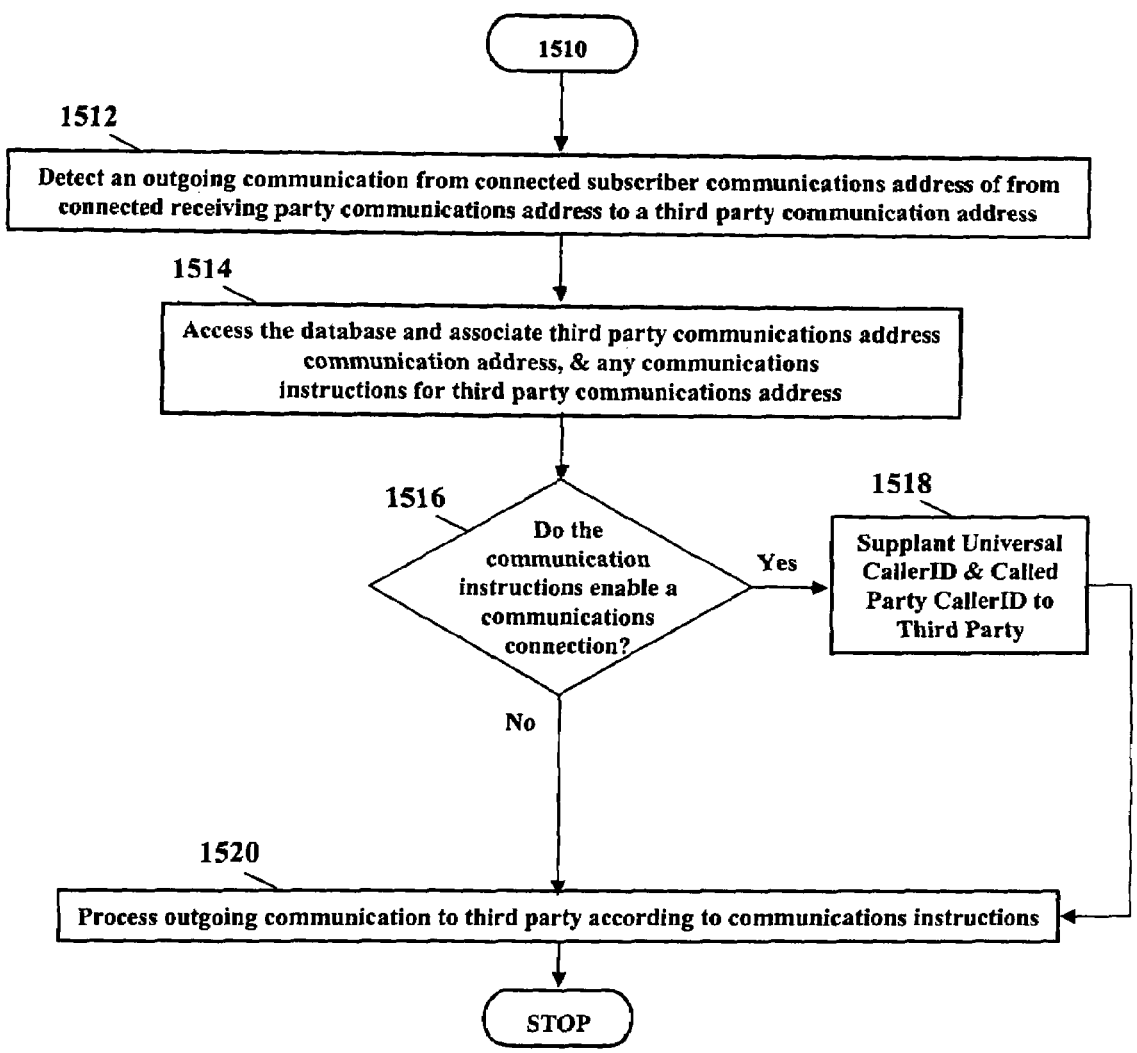

FIG. 14 and 15 are flowcharts showing an exemplary process of providing universal caller identification communications services. In step 1402, a subscriber (or other user) provides a plurality of communications addresses associated with the subscriber. In step 1404, each subscriber communications address is associated with the Universal CallerID signal, and the subscriber may further provide a description of a communications device for each communications address, activation and deactivation instructions for each communications address; other Universal CallerID profile data, and/or communications instructions (e.g., present audio and text with shared CallerID signal). And, in step 1406, the data of the Universal CallerID profile is stored in a memory device such as a database as described in some of the exemplary embodiments.

For example, the communications instruction may include an instruction for activating (or deactivating) the Universal CallerID signal for outgoing communications from each subscriber communications address (e.g., times of day, days of week for supplanting the universal caller identification signal from the subscriber's communications address), or an instruction for presenting a message back to the calling party that the communications connection cannot be established with the called party communications address (such as, if the called party blocks Universal CallerID services). And still further, each communication instruction may be established for each subscriber's communications address. Further, steps 1402, 1404, and 1406 are grouped together in block 1400 to illustrate that these steps are associated with Universal CallerID setup and may be completed in advance of the outgoing communication. Alternatively, these steps may be performed just prior to (or at the same time as communication of) the outgoing communication from the communications address, such as when the calling party uses a public pay phone to initiate an outgoing communication.

In step 1410, the calling party places a call from a communications address and the communications network detects and decodes the communication to determine or otherwise identify that the communications address is associated with the Universal CallerID service. Thereafter, in step 1412, the communications network accesses a database to associate the Universal CallerID signal with the incoming communications address (e.g., the ICLID signal or other standardized signal of the calling party communications address) and to access any communications instruction(s).

In step 1414, the communications network or a processing device in communication with the communications network processes the incoming communication in accordance with the communications instruction(s) For example, the communications instruction may include times of day for selectively activating the Universal CallerID such as using a communications address associated with work during selected business days and hours, using another communications address during the weekends, and using still another communications address when the subscriber is away from home (e.g., using a cellular phone number as a Universal CallerID). And, according to other exemplary embodiments, the Universal CallerID may be a static communications address or other calling party identifier that is provided in the shared CallerID signal regardless of times or day, days of week, called party communications address (e.g., when subscriber calls a work supervisor, he/she might select a work telephone number as the Universal CallerID to reflect a more professional incoming communication), and other variables.

If the communications instruction initiates communication, then the method continues with step 1416 and the Universal CallerID is communicated with the incoming communications signal to the called party communications address. Alternatively, the Universal CallerID may be communicated to an alternate communications address associated with the called party. For example, the alternate communications address may be provided by a communication instruction of the Universal CallerID profile, an instruction by a service provider, and a forwarding instruction associated with the communications address of the called party (e.g., a Follow Me Service. Further, even if a communications connection is not established with the called party communications address, the called party communications device, CallerID device, or other CallerID service has a record of the Universal CallerID to identify the calling party. If, however, the communications instruction does not initiate communication of the communication, then the method continues with step 1418 and the incoming communication from the subscriber's communications address is processed according to the communications instruction.

The method then continues to step 1510 of FIG. 15. The calling party places a call during an established connection with the called party to a third party. In step 1512, the third party's communications address is detected and decoded by the communications network to determine or otherwise identify that the third party's communications address or other identifier. Thereafter, in step 1514, the communications network accesses a database to associate the third party communications address or other identifier with the Universal CallerID and to access any communications instruction(s).

The communications network or a processing device in communication with the communications network processes the outgoing communication to the third party communications device in accordance with the communications instruction(s). If the communications instruction initiates updated communication to the called party's communications device, then the method continues with step 1516 and the Universal CallerID and the third party identifier is communicated to the called party communications address in step 1518 (i.e., the Universal CallerID is updated to include the Third Party CallerID). Alternatively, the Universal CallerID and Third Party CallerID may be communicated to an alternate communications address associated with the called party. For example, the alternate communications address may be provided by a communication instruction of the Universal CallerID profile, an instruction by a service provider, and a forwarding instruction associated with the communications address of the called party (e.g., a Follow Me Service. Further, even if a communications connection is not established with the called party communications address, the called party communications device, CallerID device, or other CallerID service has a record of the Universal CallerID to identify the calling party. If, however, the communications instruction does not initiate communication of the communication, then the method continues with step 1520 and the outgoing communication to the third party's communications device is processed according to the communications instruction without communicating an updated, supplanted Universal CallerID and Third Party CallerID to the called party.

The universal caller identification application (shown as reference numerals 125 and 125' in some of the figures) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the embodiments, allow the universal caller identification application to be easily disseminated.

The universal caller identification application may also be physically embodied on or in any addressable (e.g., HTTP, I.E.E.E. 802.11, Wireless Application Protocol (WAP)) wire line or wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for providing universal shared caller identification information comprising:
   detecting and decoding an incoming communication to a called party communications address;
   querying a database that associates a calling party communications address to universal, shared caller identification information comprising one incoming calling line identification signal that is common for a plurality of communications addresses;
   detecting an outgoing communication from one of the plurality of communications addresses to a third party communications address;
   associating the universal, shared caller identification information with the third party communications address comprising third party network identification information; and
   initiating a communication of the universal, shared caller identification information and the third party network identification information to the called party communications address.

2. The method of claim 1, further comprising communicating a communications signal with the universal, shared caller identification information.

3. The method of claim 1, further comprising associating the calling party communications address to a profile.

4. The method of claim 1, further comprising communicating the universal, shared caller identification information to an alternate communications address.

5. The method of claim 1, further comprising sending the universal, shared caller identification information to the called party communications address.

6. The method of claim 1, further comprising:
receiving an identifier of a calling party associated with the calling party communications address; and
using the identifier to generate the universal, shared caller identification information.

7. A system for providing universal shared caller identification information comprising:
a processor executing code stored in memory that causes the processor to:
detect and decoding an incoming communication to a called party communications address;
query a database that associates a calling party communications address to universal, shared caller identification information comprising one incoming calling line identification signal that is common for a plurality of communications addresses;
detect an outgoing communication from one of the plurality of communications addresses to a third party communications address;
associate the universal, shared caller identification information with the third party communications address comprising third party network identification information; and
initiate a communication of the universal, shared caller identification information and the third party network identification information to the called party communications address.

8. The system of claim 7, further comprising code that causes the processor to communicate a communications signal with the universal, shared caller identification information.

9. The system of claim 8, further comprising code that causes the processor to associate the calling party communications address to a profile.

10. The system of claim 8, further comprising code that causes the processor to communicate the universal, shared caller identification information to an alternate communications address.

11. The system of claim 8, further comprising code that causes the processor to send the universal, shared caller identification information to the called party communications address.

12. The system of claim 8, further comprising code that causes the processor to:
receive an identifier of a calling party associated with the calling party communications address; and
use the identifier to generate the universal, shared caller identification information.

13. A computer readable medium storing processor executable instructions for Performing a method for providing universal shared caller identification information, the method comprising:
detecting and decoding an incoming communication to a called party communications address;
querying a database that associates a calling party communications address to universal, shared caller identification information comprising one incoming calling line identification signal that is common for a plurality of communications addresses;
detecting an outgoing communication from one of the plurality of communications addresses to a third party communications address;
associating the universal, shared caller identification information with the third party communications address comprising third party network identification information; and
initiating a communication of the universal, shared caller identification information and the third party network identification information to the called party communications address.

14. The computer readable medium of claim 13, further comprising instructions for communicating a communications signal with the universal, shared caller identification information.

15. The computer readable medium of claim 13, further comprising instructions for associating the calling party communications address to a profile.

16. The computer readable medium of claim 13, further comprising instructions for communicating the universal, shared caller identification information to an alternate communications address.

17. The computer readable medium of claim 13, further comprising instructions for sending the universal, shared caller identification information to the called party communications address.

18. The computer readable medium of claim 13, further comprising instructions for:
receiving an identifier of a calling party associated with the calling party communications address; and
using the identifier to generate the universal, shared caller identification information.

\* \* \* \* \*